United States Patent
Drinkard et al.

(10) Patent No.: US 12,092,476 B2
(45) Date of Patent: Sep. 17, 2024

(54) METHOD AND APPARATUS FOR UPDATING AN ENVIRONMENT MAP USED BY ROBOTS FOR SELF-LOCALIZATION

(71) Applicant: Omron Corporation, Kyoto (JP)

(72) Inventors: John Drinkard, San Ramon, CA (US); Karthik Mahesh Varadarajan, San Ramon, CA (US)

(73) Assignee: OMRON CORPORATION, Kyoto (JP)

( * ) Notice: Subject to any disclaimer, the term of this patent is extended or adjusted under 35 U.S.C. 154(b) by 246 days.

(21) Appl. No.: 17/692,766

(22) Filed: Mar. 11, 2022

(65) Prior Publication Data

US 2022/0291692 A1     Sep. 15, 2022

Related U.S. Application Data

(60) Provisional application No. 63/161,196, filed on Mar. 15, 2021.

(51) Int. Cl.
*G01C 21/00* (2006.01)
*G05D 1/00* (2024.01)
(Continued)

(52) U.S. Cl.
CPC ....... *G01C 21/3804* (2020.08); *G05D 1/0274* (2013.01); *G05D 1/242* (2024.01);
(Continued)

(58) Field of Classification Search
CPC .............. G01C 21/3804; G01C 21/383; G01C 21/3841; G01C 21/3848; G05D 1/0274;
(Continued)

(56) References Cited

U.S. PATENT DOCUMENTS 5,525,883 A * 6/1996 Avitzour .............. G05D 1/0274
                                                        318/587
7,689,321 B2 * 3/2010 Karlsson .............. G05D 1/0246
                                                        701/28
(Continued)

FOREIGN PATENT DOCUMENTS

JP          2018017826 A       2/2018
JP          2019003602 A       1/2019
(Continued)

OTHER PUBLICATIONS

Abdulgalil, A Mahmoud, "Multi-Robot SLAM: An Overview", Multi-robot SLAM: An Overview and Quantitative Evaluation of MRGS ROS Framework for MR-SLAM. 10.1007/978-3-319-78452-6_15., 2019, 11 pages.
(Continued)

*Primary Examiner* — Dale W Hilgendorf
(74) *Attorney, Agent, or Firm* — Murphy, Bilak & Homiller, PLLC

(57) ABSTRACT

A map updating technique offers the performance advantages gained by robots using a good-quality static map for autonomous navigation within an environment, while providing the convenience of automatic updating. In particular, one or more robots log data while performing autonomous navigation in the environment according to the static map, and a computer appliance, such as a centralized server, collects the logged data as historic logged data, and performs a map update process using the historic logged data. Such operations provide for periodic or as needed updating of the static map, based on observational data from the robot(s) that capture changes in the environment, without need for taking the robot(s) offline for the computation.

24 Claims, 14 Drawing Sheets

(51) Int. Cl.
  *G05D 1/242* (2024.01)
  *G05D 1/246* (2024.01)
  *G05D 1/698* (2024.01)
  *G06F 8/656* (2018.01)
  *G06N 7/01* (2023.01)
  *G06T 7/579* (2017.01)

(52) U.S. Cl.
  CPC ........... *G05D 1/246* (2024.01); *G05D 1/2464* (2024.01); *G05D 1/6987* (2024.01); *G06F 8/656* (2018.02); *G06T 7/579* (2017.01); *G01C 21/383* (2020.08); *G01C 21/3841* (2020.08); *G01C 21/3848* (2020.08); *G06N 7/01* (2023.01)

(58) Field of Classification Search
  CPC ...... G05D 1/242; G05D 1/246; G05D 1/2464; G05D 1/6987; G06F 8/656; G06T 7/579; G06N 7/01
  See application file for complete search history.

(56) References Cited

U.S. PATENT DOCUMENTS

| | | | |
|---|---|---|---|
| 11,119,496 B1* | 9/2021 | Ebrahimi Afrouzi | G05D 1/0274 |
| 11,567,501 B2* | 1/2023 | Leßmann | G01S 13/931 |
| 2004/0167716 A1* | 8/2004 | Goncalves | G06T 7/70 340/995.1 |
| 2013/0138246 A1* | 5/2013 | Gutmann | G01S 17/06 901/1 |
| 2014/0058610 A1* | 2/2014 | Sofman | G05D 1/024 701/461 |
| 2014/0129027 A1* | 5/2014 | Schnittman | G05D 1/0219 700/253 |
| 2015/0261223 A1 | 9/2015 | Fong et al. | |
| 2015/0304634 A1* | 10/2015 | Karvounis | G06F 18/21355 348/46 |
| 2018/0224284 A1* | 8/2018 | Danford | G01C 21/3841 |
| 2019/0186923 A1* | 6/2019 | Servos | G05D 1/0246 |
| 2019/0347249 A1* | 11/2019 | Sekiguchi | G06F 16/23 |
| 2020/0050205 A1* | 2/2020 | McClelland | G01C 21/20 |
| 2020/0103915 A1* | 4/2020 | Holz | G05D 1/0088 |
| 2020/0191591 A1* | 6/2020 | Zhang | G06V 20/582 |
| 2021/0404829 A1* | 12/2021 | St. Romain | G08G 1/0129 |
| 2023/0061444 A1* | 3/2023 | Hong | G05D 1/0248 |
| 2023/0145649 A1* | 5/2023 | Miksa | G01C 21/3841 701/24 |
| 2023/0332920 A1* | 10/2023 | Ogawa | G01C 21/3885 |

FOREIGN PATENT DOCUMENTS

| | | |
|---|---|---|
| JP | 2019510240 A | 4/2019 |
| JP | 2019175137 A | 10/2019 |
| JP | 2021018640 A | 2/2021 |

OTHER PUBLICATIONS

Andersone, Ilze, "Heterogeneous Map Merging: State of the Art", Department of Artificial Intelligence and Systems Engineering, Riga Technical University, Riga LV-1658, Latvia, Aug. 20, 2019, 29 pages.

Aragues, Rosario, "Consistent Data Association in Multi-robot Systems with Limited Communications", Consistent data association in multi-robot systems with limited communications. 10.15607/RSS.2010.VI.013., 2010, 8 pages.

Aulinas, J, et al., "Local map update for large scale SLAM", Electronics Letters, vol. 46, No. 8, Apr. 15, 2010, 3 pages.

Bonanni, Taigo Maria, "Merging Partially Consistent Maps", SIMPAR 2014. Lecture Notes in Computer Science(), vol. 8810. Springer, Cham., 2014, 12 pages.

Cadena, Cesar, et al., "Past, Present, and Future of Simultaneous Localization And Mapping: Towards the Robust-Perception Age", arXiv:1606.05830v3 [cs.RO], Nov. 23, 2016, 27 pages.

Chen, Yuncong, "Algorithms for Simultaneous Localization and Mapping (SLAM)", Department of Computer Science University of California, San Diego, Feb. 4, 2013, 42 pages.

Cunningham, Alexander, et al., "Fully Distributed Scalable Smoothing and Mapping with Robust Multi-robot Data Association", 2012 IEEE International Conference on Robotics and Automation, 2012,, 8 pages.

Grisetti, Giorgio, et al., "Fast and Accurate SLAM with Rao-Blackwellized Particle Filters", Robotics and Autonomous Systems, vol. 55, Issue 1,, 2007, 16 pages.

Halodová, Lucie, et al., "Predictive and adaptive maps for long-term visual navigation in changing environments", IEEE International Conference on Intelligent Robots and Systems, 2019, 8 pages.

Koeslag, Henrik Johan, "Multi Robot SLAM Pose Estimate Enhancement", Master's Thesis / Essay, Artificial Intelligence, Sep. 2007, 66 pages.

Kümmerle, R, et al., "On Measuring the Accuracy of SLAM Algorithms", Autonomous Robots, (27), 4., 2009, 28 pages.

Kurth, Derek, "Range-Only Robot Localization and SLAM with Radio", Robotics Institute, Carnegie Mellon Univ., Pittsburgh, Master's thesis CMU-RI-TR-04-29, May 2004, 60 pages.

Lin, Mingwei, et al., "Intelligent Filter-Based SLAM for Mobile Robots With Improved Localization Performance", IEEE Access, Digital Object Identifier 10.1109/Access.2019.2934995, 2019, 14 pages.

Pei, Fujun, et al., "Distributed SLAM Using Improved Particle Filter for Mobile Robot Localization", Hindawi Publishing Corporation, The Scientific World Journal, vol. 2014, Article ID 239531, 2014, 11 pages.

Sim, Robert, et al., "A Study of the Rao-Blackwellised Particle Filter for Efficient and Accurate Vision-Based SLAM", International Journal of Computer Vision 74(3), 2007, 16 pages.

Strasdat, Hauke, et al., "Visual SLAM: Why Filter?", Department of Computing, Imperial College London, UK, Feb. 27, 2012, 36 pages.

Yan, Zike, et al., "Flow-based SLAM: From geometry computation to learning", Virtual Reality & Intelligent Hardware, vol. 1, Issue 5, Oct. 2019, 2 pages.

Zhang, Tengfei, et al., "Improved grid mapping technology based on Rao-Blackwellized particle filters and the gradient descent algorithm", Systems Science & Control Engineering, 7:1, 65-74, DOI: 10.1080/21642583.2019.1566858, 2019, 11 pages.

\* cited by examiner

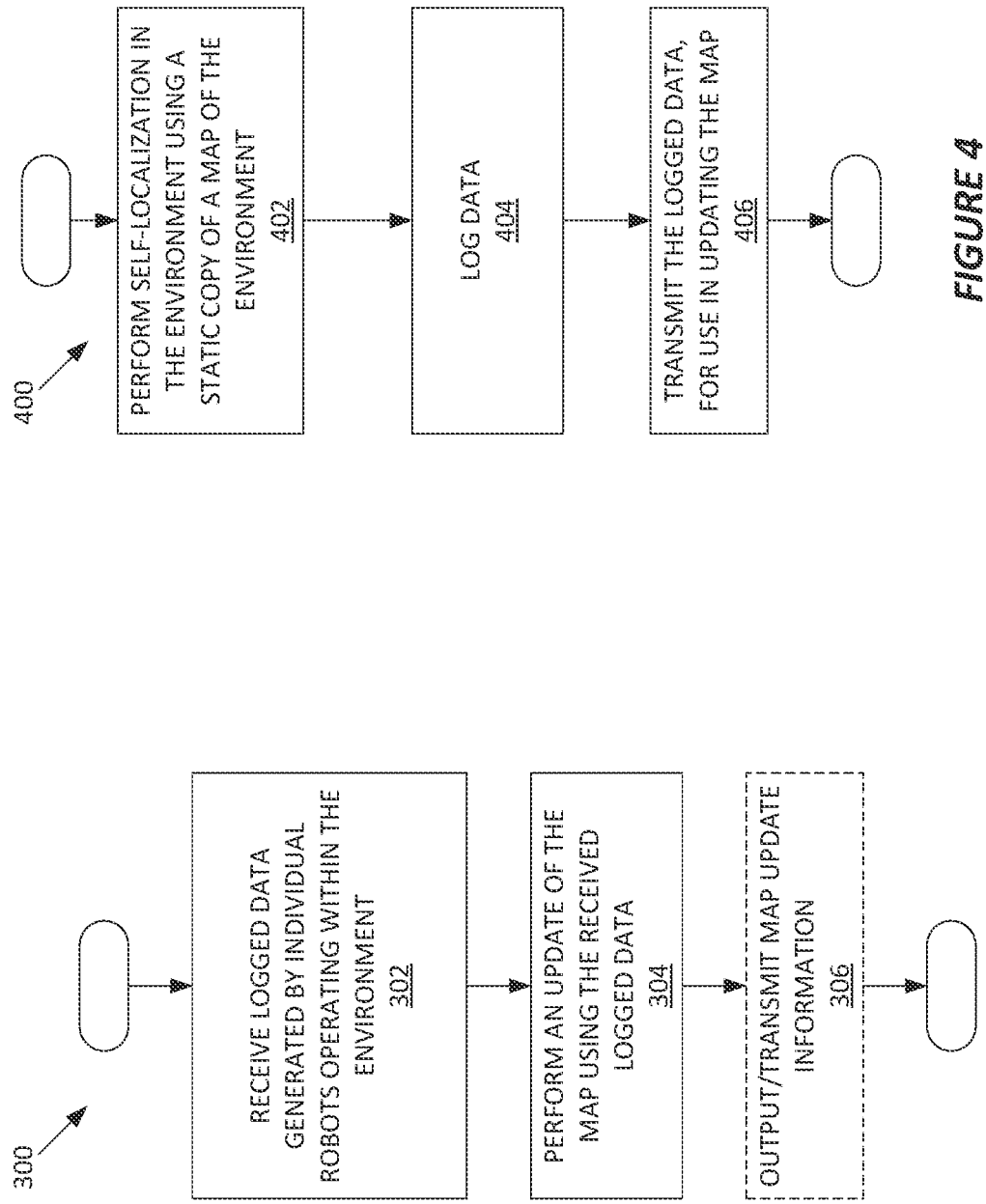

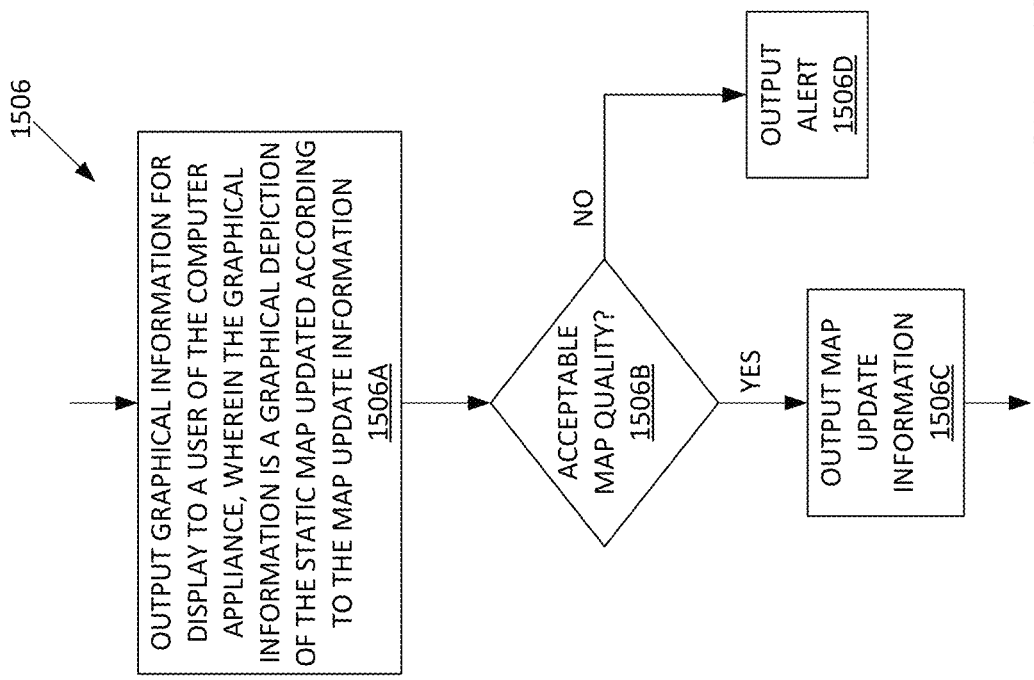
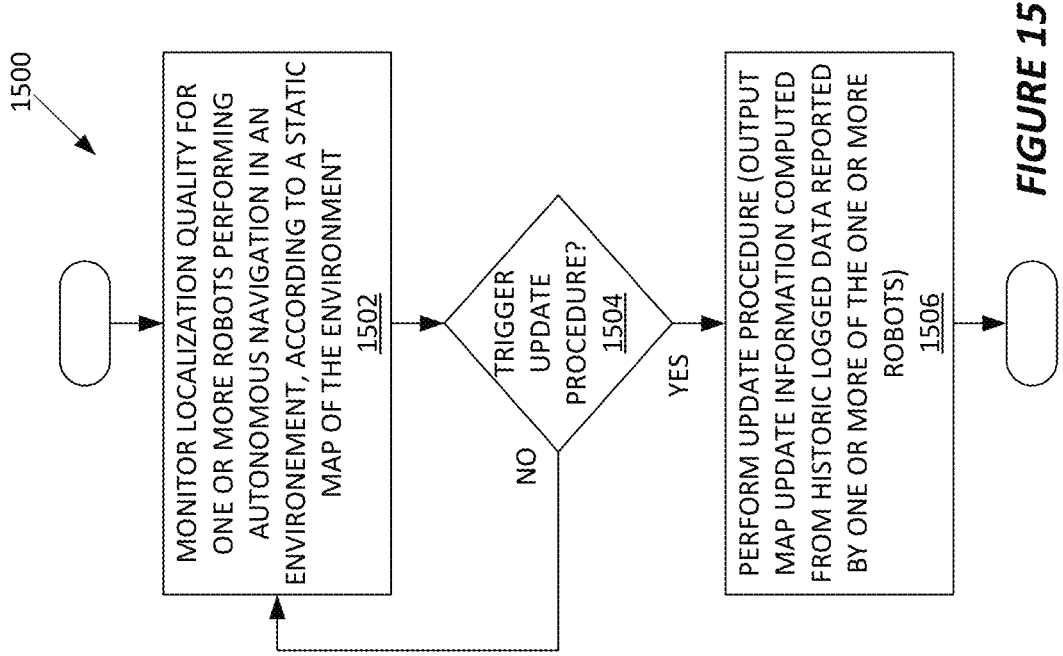

METHOD AND APPARATUS FOR UPDATING AN ENVIRONMENT MAP USED BY ROBOTS FOR SELF-LOCALIZATION

TECHNICAL FIELD

Methods and apparatus disclosed herein provide for use of a static map of an environment, for use by robots in performing self-localization while operating in the environment, while further providing for updating of the map from time to time, based on batched processing of logged data collected from the robots.

BACKGROUND

A robot executing tasks in an environment such as a warehouse or factory floor moves from one "goal" to the next, for example, where each goal has a corresponding location in the environment. Autonomous navigation by the robot in the environment in support of task execution requires the robot to maintain an accurate understanding of its location and orientation with the environment, which may be referred to as "localization." The phase corresponding to execution of tasks by the robots is referred to as the "task phase."

The robot uses one or more types of sensors, for example, to sense its immediate surroundings and it compares what it senses to a map of the environment, to identify its most probable current location and orientation. Such a map can be created from CAD-based floor plans of the environment or in a manual mapping phase that is carried out prior to the task phase, using sensor data.

A technique referred to as "Simultaneous Localization and Mapping" or SLAM allows a robot to create a map of the environment and to revise that map on an ongoing basis. Map revisions follow from the robot detecting differences between what its sensors detect for a current location and orientation of the robot, in comparison to what it should sense according to the map for that location and orientation.

A map that is updated by the robot during task execution, such as is done using conventional SLAM, may be referred to as an "online" or "dynamic" map to denote that the robot updates its map on an ongoing basis, while using the map to navigate within the environment for task execution. The online maps used by respective robots deteriorate over time because of the errors intrinsic to the SLAM-based map updating process. Map deterioration manifests itself, for example, as drift in critical landmarks used by the robot for localization.

If the initial map differs significantly from the current environment, the only recourse conventionally has been to re-map the environment, with the resulting map then used by robots for navigation in the environment. Disadvantages include the difficulty in capturing map "modalities" via manual mapping, and the time and costs of manually remapping the environment. Such costs include the penalty of taking the robots that rely on the map offline, during the remapping process.

SUMMARY

A map updating technique offers the performance advantages gained by autonomous robots using a good-quality static map for autonomous navigation within an environment, while providing the convenience of automatic updating. In particular, one or more robots log data while performing autonomous navigation in the environment according to the static map, and a computer appliance, such as a centralized server, collects the logged data as historic logged data, and performs a map update process using the historic logged data. Such operations provide for periodic or as needed updating of the static map, based on actual observational data collected from the environment by the robot(s), but allowing for richer, more time-consuming updating to be performed by the computer appliance without need for taking the robot(s) offline for the computation.

One embodiment comprises a method performed by a computer appliance. The method includes monitoring localization quality for one or more robots performing autonomous navigation in an environment according to a static map of the environment. The localization quality experienced by any particular robot at any particular time is dependent upon the degree to which a relevant portion of the static map agrees with local environmental features sensed by the robot. The method further includes triggering an update procedure responsive to the monitored localization quality for one or more of the one or more robots falling below a defined threshold. The update procedure comprises outputting map update information for the static map, for transmission to the one or more robots. The map update information is computed from historic logged data based on one or more of the one or more robots reporting logged data during operation in the environment. The logged data from any particular robot comprises sensor data used by the particular robot for performing localization for autonomous navigation within the environment, along with one or both of corresponding odometry data and corresponding localization data used in localization processing performed by the particular robot.

Another embodiment comprises a computer appliance that includes a communication interface and processing circuitry that is operatively associated with the communication interface—i.e., uses the communication interface to send and receive information. The processing circuitry is configured to monitor localization quality for one or more robots performing autonomous navigation in an environment according to a static map of the environment. The processing circuitry is further configured to trigger the aforementioned update procedure responsive to the monitored localization quality for one or more of the one or more robots falling below a defined threshold.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 3 is a logic flow diagram of one embodiment of a method of updating a map.

FIG. 4 is a logic flow diagram of one embodiment of a method of a robot performing self-localization and transmitting logged data.

FIGS. 15 and 16 are logic flow diagrams of a method of operation by a computer appliance, according to one embodiment.

DETAILED DESCRIPTION

Figure 1:
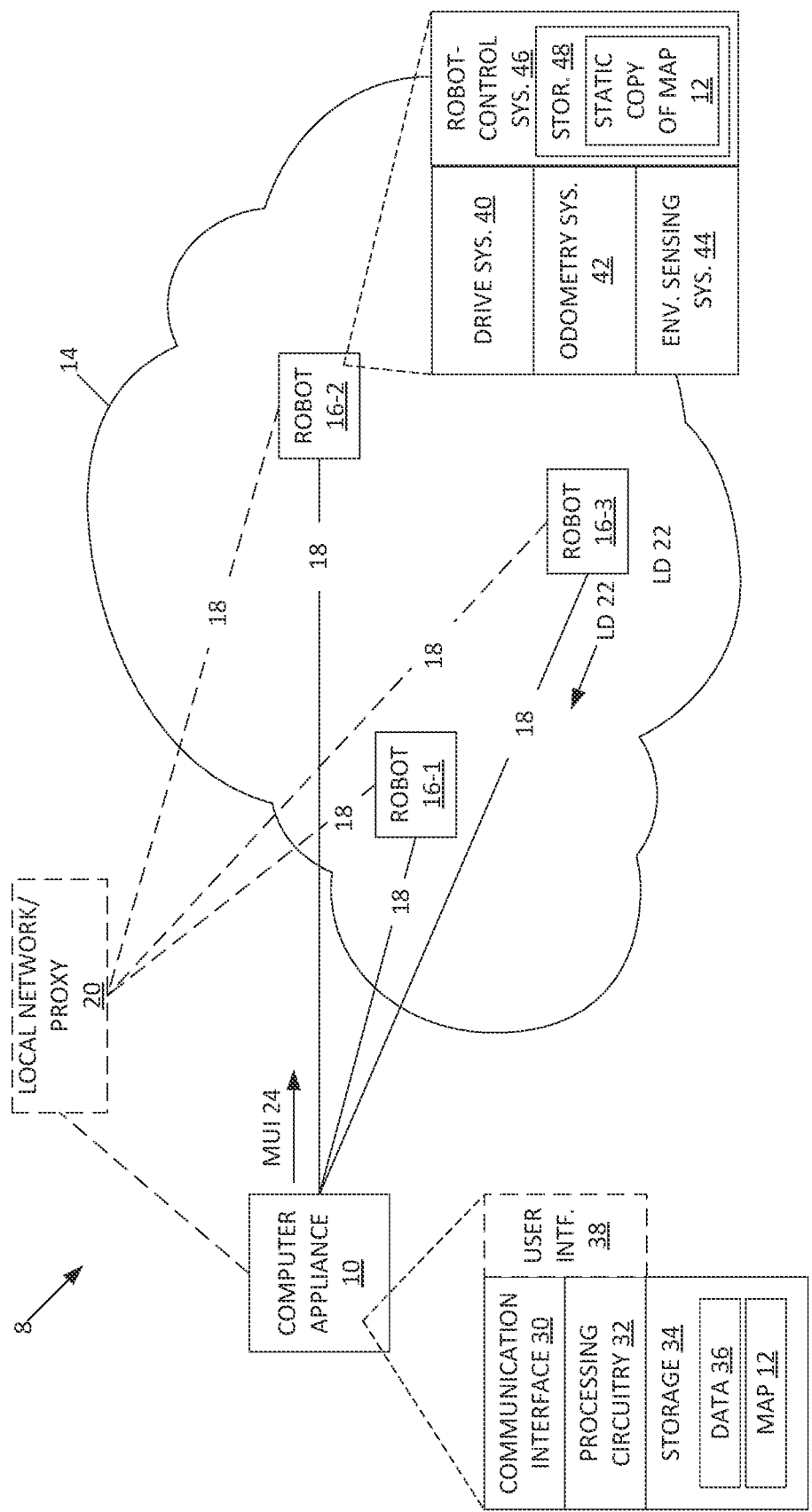
FIG. 1 is a block diagram of one embodiment of a system that includes one or more robots and a computer appliance.

FIG. 1 is a block diagram of one embodiment of a system 8 that includes a computer appliance 10, also referred to as a "computer server." A map 12 of an environment 14 is used by one or more robots 16 for performing self-localization while operating in the environment 14. Each robot 16 uses a static copy of the map 12 for performing self-localization. Herein, the term "self-localization" refers to the operations performed by a robot 16 for determining its pose within an environment 14, with the term "pose" denoting at least the location of the robot in the applicable coordinate system or frame of reference. "Pose" may further denote the orientation of the robot 16 within the environment 14. An example "pose" comprises two- or three-dimensional coordinate values and one or more angular values indicating a facing direction of the robot 16.

Certain aspects of map updating, which holds particular interest herein, benefit from having more than one robot 16 operating in the environment 14. Correspondingly, FIG. 1 offers the example of a "fleet" of three robots 16-1, 16-2, and 16-3 operating in the environment 14. However, the techniques disclosed herein apply to varying numbers of robots 16, from a single robot 16 to fleets of many tens or hundreds of robots 16, or more.

Similar points of flexibility apply regarding the environment 14 and the robots 16 operating within the environment 14. A non-limiting example involves a warehouse or factory floor as the environment 14 and wheeled or tracked autonomous vehicles as the robots 16. However, the robots 16 may be unmanned aerial vehicles (UAVs) operating within an airspace as the environment 14, such as drones conveying payloads within an open or closed airspace. Because of the range of robot types contemplated, the robots 16 are also referred to as "end-units" or autonomous intelligent vehicles (AIVs). Moreover, the individual robots 16 constituting a "fleet" operating within the environment 14 need not be homogenous; instead, there may be two or more types of robots 16, with differing configurations, capabilities, and task responsibilities.

A common point of operation regardless of the robot type is that each robot 16 operating in the environment performs autonomous navigation within the environment 14 by performing self-localization using a static copy of a map 12 of the environment 14. In contrast to each robot 16 performing Simultaneous Localization and Mapping or "SLAM" for autonomous navigation, each robot 16 performs self-localization using the map 12 but does not update its copy of the map 12 during "live" navigation within the environment 14. Instead, the computer appliance 10 performs map updating from time to time, such as on a conditional or triggered basis, or on demand.

Adopting a hybrid approach in which the robots 16 do not update their copies of the map 12 but instead operate with a static or fixed copy of the map 12, with map updating performed by the computer appliance 10, the robots 16 may be provisioned with a map of arbitrarily high quality. For example, the map 12 may be determined initially using an offline process wherein the robot(s) 16 or other equipment involved in developing the map 12 of the environment 14 are not obligated to perform other tasks or jobs, and multiple "passes" or iterations may be used to develop the initial version of the map 12. As such, the robots 16 benefit from having a higher quality map than they might individually develop using SLAM.

Of course, the environment 14 might change over time, slowly or rapidly, or it may "cycle" through varying configurations in dependence on time of day, day or week, or the like. Periodic or reoccurring changes in the environment 14 may be referred to as "modes" of the environment 14.

Thus, the state of the environment 14 at any given location and at any given time may deviate from the map 12 currently in use at the robots 16. Such deviations affect the "quality" of self-localization by the individual robots 16 using the map 12 to navigate within the environment 14. Here, "quality" measures or represents the level of confidence associated with a robot's ability to determine its most probable pose at any given time during live operation by the robot 16 within the environment 14. As the map 12 becomes "stale" in view of changes occurring in the environment 16, the quality of self-localization deteriorates, at least within the affected areas of the environment 14.

Falling localization quality affects a robot's ability to carry out assigned tasks and implies risks to the safety of persons sharing the environment 14 with the robots 16, and also risks to the robots 16 and other equipment within the environment 14. Consequently, a key advantage of the hybrid localization and map updating contemplated herein is the conditional or on-demand updating of the map 12 by the computer appliance 10, which has the advantage of processing the map updates on a "batched" basis, without need for taking the robots 16 offline while the map 12 is being updated.

The hybrid approach allows the robots 16 to operate with the advantages of a high-quality map 12 and allows the computer appliance 10 to update or refresh that map 12 while the robot(s) 16 continue operating with their respective current, static copies of the map 12. Only a minimal interruption to ongoing operations by each individual robot 16 occurs in conjunction with pushing updates of the map 12 to the robot 16. Moreover, the map updates determined by the computer appliance 10 accurately track or account for changes in the environment 14 because they are based on the computer appliance 10 receiving the logged data generated by the individual robots 16 as they move within the environment 14 using their respective static copies of the map 12.

In one sense, the hybrid approach can be understood as offloading the task of map updating to an "offline" entity, such that map updates of arbitrary quality can be determined while robot operations are ongoing, allowing, of course, for the possibility of halting such operations if the localization quality for any one or more of the robots 16 deteriorates below some defined quality threshold.

In one or more embodiments of the hybrid approach to self-localization and map updating, the robots 16 have wired or wireless links 18 to the computer appliance 10, or to another entity, such as a local network/proxy 20 that provides an indirect pathway for sending the robot-generated logged data 22 to the computer appliance 10, for use in determining map updates. As an example of a wired version of the links 18, recharging stations—not shown—provide for Ethernet or powerline-based communications between the robots 16 and the computer appliance 10 or proxy 20, while the robots 16 recharge. In other embodiments, the links 18 are wireless, such as Wireless Local Area Network (WLAN) links or Wide Area Network (WAN) links.

Regardless of the implementation details of the links 18, the computer appliance 10 is configured to "push" or "distribute" map update information 24 ("MUI" in the figure) to the robots 16 directly or indirectly, e.g., via the proxy 20. Such pushes may be performed automatically, according to a timed basis or other conditional triggering, or may be performed on-demand, such as under the control of a human operator. A human operator also may provide the ultimate supervisory decision regarding whether or when the computer appliance 10 pushes the MUI 24 to the robots 16. Here, the MUI 24 comprises, for example, the latest updated version of the map 12, or change data by which the respective robots 16 can update their local static copies of the map 12 to the latest version.

As a simple example, there is a "current" version of the map 12 provisioned in the respective robots 16 and each robot 16 uses its static copy of that current version of the map 12 to perform self-localization. Upon each robot 16 receiving the MUI 24, the robot 16 replaces or otherwise updates the local static copy of the map 12 held in its memory, for use in resumed localization operations. The individual robots 16 may stop operations briefly, for updating their local static copies of the map 12 using the received MUI 24, and then resume operations using the updated version of the map 12.

The computer appliance 10 obtains the logged data 22 generated by individual ones of the robots 16 and performs its own version of SLAM using the logged data 22 from the robots 16. The logged data 22 from each robot 16 comprises at least sensor data logged by the robot 16. The sensor data may include content that is useful for map annotation. In an example case, the sensor data may include sensed values of motor currents and torques associated with the robot 16 moving autonomously within the environment 14 via a drive system. The sensor data logged by the robot 16 may comprise or include the environmental sensing data used by the robot 16 for sensing its immediate surroundings and movements within the environment 14, for purposes of performing self-localization. Such sensor data includes, for example, any one or more of camera data, ultrasonic-sensor data, and LIDAR or laser scanner data obtained from planer or volumetric laser scans performed by the robot 16, to obtain depth maps or point clouds indicating surrounding physical features in the environment 16.

In one or more embodiments, the logged data includes various types of sensor data, including the sensor data used for self-localization, and further includes localization processing results. Thus, unless clear from the surrounding context or otherwise explained, the term "logged data" herein shall be understood as meaning one or more types of sensor data logged by the robot 16 during operation in the environment 14, where such data may include odometry data, and where the logged data in one or more embodiments may further include localization processing results, such data produced by a Monte Carlo Localizer (MCL) or other localization algorithm running in the robot 16. In at least one example, the robot 16 uses a particle-filter based localization algorithm and the logged data may include particles generated by the particle filtering algorithm.

As noted, execution of SLAM by the computer appliance 10 does not affect the robots 16, which can continue "normal" or "live" operations in the environment 14 using their current version of the map 12. That is, the robots 16 can continue operations while the computer appliance 10 collects logged data 22 from the individual robots 16 and performs map updating.

Moreover, SLAM as performed by the computer appliance 10 distinguishes from conventional SLAM used in autonomous vehicles in several respects. First, the computer appliance 10 essentially is "replaying" and supplementing localization operations previously performed by the robots 16, rather than performing live localizations. Second, the SLAM processing applies to a batch of logged data 22, which may cover multiple time periods with differing environmental characteristics in play between those time periods, and it may come from multiple robots 16 viewing the same or overlapping portions of the environment 14 from different perspectives and with different systematic errors affecting their respective localization processing. Correspondingly, the SLAM performed by the computer appliance 10 in one or more embodiments is a batch-optimized SLAM that accounts for or reconciles the inhomogeneity of the logged data 22 that is batched for processing.

Other example details depicted in FIG. 1 include implementation details for the computer appliance 10 and a representative one of the robots 16, according to one or more embodiments. Entities included in the computer appliance 10 include a communication interface 30, processing circuitry 32, and storage 34, e.g., for storing data 36 and the map 12. The computer appliance 10 also may include a user interface 38 or may couple to a user interface via the communication interface 30, such as by communicatively coupling to a PC or other device that provides a user interface.

The communication interface 30 comprises a network or computer-data interface, such as an Ethernet interface. Additionally, or alternatively, the communication interface 30 includes wireless communication circuitry—a radio-frequency transceiver—and provides for wireless communications, such as for Wi-Fi or other WLAN connectivity. Broadly, the communication interface 30 is operative to output messages or other signaling generated by the processing circuitry 32 and to input incoming/received messages or other received signaling into the processing circuitry 32.

The processing circuitry 32 comprises, for example, one or more microprocessors or digital signal processors, or other digital processing circuitry. In at least one embodiment, the processing circuitry 32 comprises one or more microprocessors that are specially adapted to carry out the operations described herein for the computer appliance 10, based at least in part on the execution of computer program instructions from one or more computer programs stored in the storage 34. To that end, the storage 34 comprises one or more types of computer-readable media, such a mix of volatile and non-volatile storage. Examples include Random Access Memory (RAM) as working memory for program execution and FLASH, EEPROM, or Solid-State Disk (SSD) for longer-term storage of the involved computer programs and any supporting configuration data 36. Such data comprises, for example, logged data 22 recorded by the robots 16 and accumulated for batch processing by the computer appliance 10.

In an example embodiment, each robot 16 comprises a drive system 40, an odometry system 42, an environmental sensing system 44, and a robot-control system 46, which may include storage 48 or have the storage 48 associated therewith. Details of these entities or subsystems vary in dependence on the design of the robot 16 and its intended purpose and capabilities. For example, details of the drive, odometry, and environmental sensing systems 40, 42, and 44 may differ sharply as between a wheeled or tracked robot intended for autonomous movement on the ground versus a flying robot intended for autonomous flight within an airspace. In this regard, at least, the odometry system 42 may also be referred to as a dead-reckoning system, indicating its use in measuring or estimating the degree or extent of movement by the robot 16 in relation to some reference location.

For a wheeled or tracked robot, the drive system 40 in an example embodiment comprises one or more drive wheels and one or more corresponding drive motors, with one or more rotary encoders or other sensing mechanisms in the odometry system 42 used to sense speed and distance of travel. In a flying robot, the drive system 40 in an example embodiment includes one or more propellers or rotors and one or more corresponding drive motors, with airspeed, altitude, and other sensors included in the odometry system 42.

As for the environmental sensing system 44, it comprises, in an example case one or more LIDAR or RADAR sensors, or both, and may additionally or alternatively include one or more cameras for machine-vision based sensing. In one implementation or scenario, a robot 16 transports materials, sub-assemblies, or finished goods within a production environment and it navigates throughout the involved building or defined workspace as the environment 14, using a static copy of a map 12 of that environment. For example, the robot 16 in such a case includes LIDAR sensors or cameras or ultrasonic sensors, or some mix thereof, for sensing obstacles such as walls, pallets, machinery, other robots, etc., within the environment 14. Correspondingly, the robot-control system 46 carries out path planning in support of executing one or more assigned tasks or jobs, with the path planning relying on the robot 16 determining where it is within the environment 14 at any given instant, using the data generated by its odometry system 42 and its environmental sensing system 44 and its local static copy of the map 12 of the environment 14.

Figure 2:
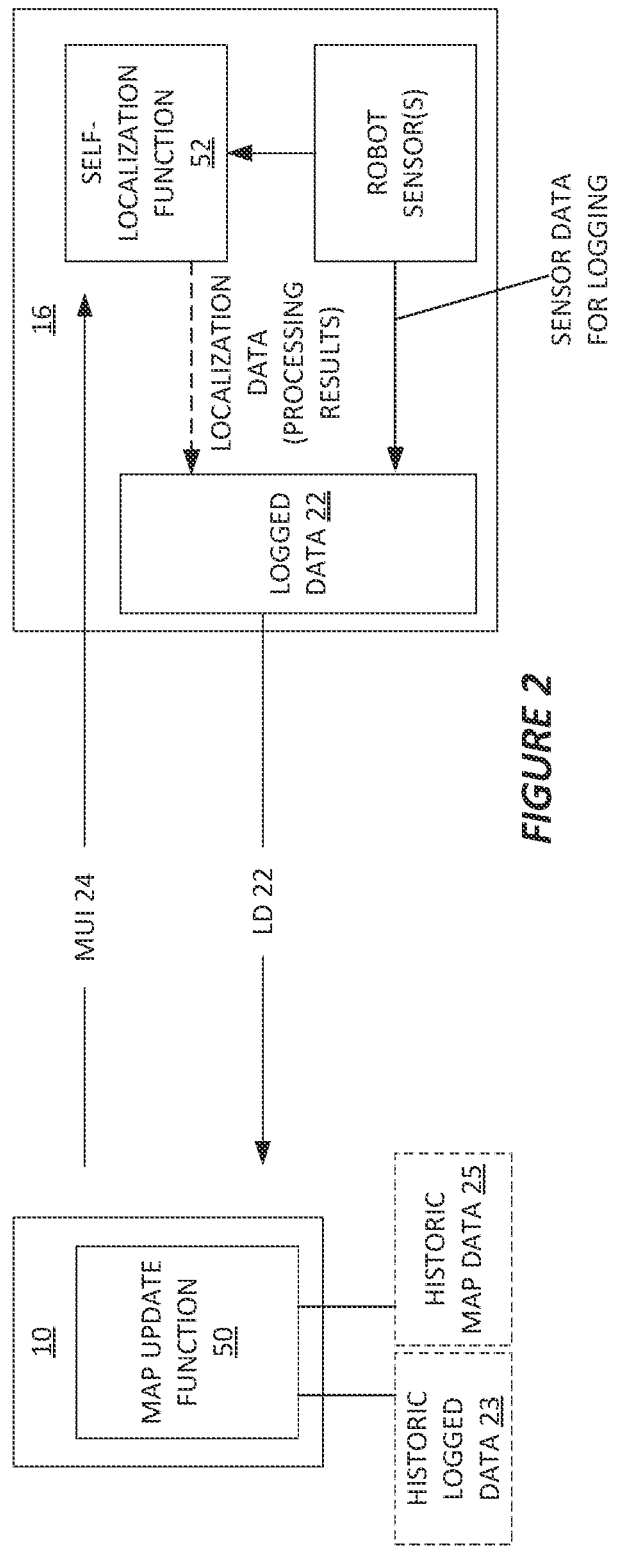
FIG. 2 is a block diagram of one embodiment of a computer appliance that implements a map update function, for updating a map of an environment, and a robot that implements a self-localization function that uses a static copy of the map for autonomous navigation within the environment.

FIG. 2 depicts an example arrangement wherein the computer appliance 10 implements a map update function 50 and a robot 16 implements a self-localization function 52 that determines the robot's location in the environment 14 during operation of the robot 16. Again, there may be multiple robots 16, each implementing a self-localization function 52 that the robot 16 uses for self-localization within the environment The data that is recorded by the robot 16 as logged data 22 includes, for example, sensor data used by the robot 16 for performing localization for autonomous navigation within the environment 14, along with one or both of corresponding odometry data and corresponding localization data used in localization processing performed by the robot 16. Such data is generated or otherwise used by the robot 16 for localizing the robot 16 within the environment 14 in real time or near real time while the robot 16 carries out its assigned or programmed duties (operates) within the environment 14 during the task phase.

As noted, one or more of the one or more robots 16 operating in the environment 14 reports its logged data 22, e.g., on an ongoing or periodic basis, and that logged data 22 is used by the computer appliance 10 as historic logged data 23 for determining map update information. FIG. 2 depicts the logged data 22 collected from the one or more robots 16 as "historic logged data 23," to denote that it may contain data collected over an extended time or over multiple time intervals or from multiple robots 22.

Thus, the historic logged data 23 used by the computer appliance 10 may comprise a potentially large batch of data, comprising multiple sets of logged data 22 corresponding to multiple reports from one or more robots 16. Any reference to "the then available data" in the context of the historic logged data 23 shall be understood as referring to the data that is, at the particular time of interest, available at the computer appliance 10, i.e., data that has been reported from the robot(s) 16. FIG. 2 also depicts "historic map data 25" to denote the fact that the static map 12 at the computer appliance 10 may be an updated version of an older copy of a static map, e.g., an updated map produced by a subsequent map update performed by the computer appliance 10. The historic map data 25 may also be referred to as historic map update information.

FIG. 3 illustrates one embodiment of a method 300 performed by a computer appliance 10, with the method 300 including the computer appliance 10 receiving (Block 302) logged data 22 that was generated by individual robots 16 operating in the environment 14. Further included in the method 300 is the step or operation of the computer appliance 10 performing (304) an update of the map 12, using the received logged data 22. Again, the computer appliance 10 may receive the logged data 22 directly from the robots 16, or indirectly through one or more intermediaries or through an accessible database. Further, the logged data 22 may be sent regularly by each robot 16, e.g., such as whenever the robot 16 has logged a threshold amount of data from ongoing operation of the robot 16 within the environment 14, with the computer appliance 10 then aggregating or otherwise batching together logged data 22 from one or more time periods and/or one or more robots 16, to obtain a data batch to process for determining map updates.

Optional further steps or operations in the method 300 include the computer appliance 10 transmitting (Block 306) map update information (MUI 24 in FIG. 1), or otherwise outputting the MUI 24 to make it available for dissemination to the robots 16. Such operations may be performed autonomously by the computer appliance 10, or they may be gated, or controlled, by, or otherwise predicated on a human operator providing the final decision or permission to push the MUI 24 out to the robots 16.

FIG. 4 illustrates a method 400 of operation by a robot 16 according to one or more embodiments, where the method 400 complements the method 300 in the sense that it provides logged data 22 for use by a computer appliance 10 in performing updates to a map 12 that used by the robot 16 for performing self-localization within an environment 14 represented by the map 12. Steps or operations of the method 400 include the robot 16 performing (Block 402) self-localization within the environment 14, and the robot 16 logging (Block 404) data from one or more of its sensors. Further, the method 400 includes the robot 16 transmitting (Block 406) the logged data 22, for use in updating the map 12.

Figure 5:
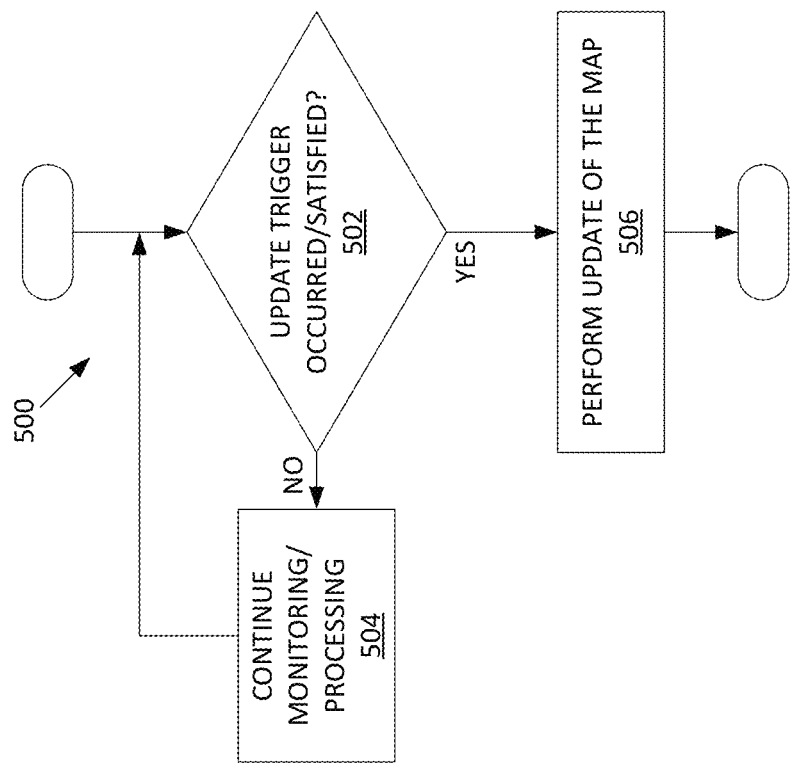
FIG. 5 is a logic flow diagram of one embodiment of conditional map updating.

FIG. 5 illustrates a method 500 of operation by a computer appliance 10, according to one or more embodiments of "conditional" map updating at the computer appliance 10. The method 500 includes the computer appliance 10 determining whether an update trigger has occurred or is otherwise satisfied (Block 502). If not (NO from Block 502), the computer appliance continues monitoring for conditional fulfillment of the trigger, as part of performing other ongoing processing (Block 504), such as collecting or compiling logged data 22 from individual robots 16, as generated during their operation in the environment 14.

If the update trigger occurs or is otherwise satisfied (YES from Block 502), the method 500 continues with the computer appliance 10 performing an update of the map 12 (Block 506). As noted, the computer appliance 10 in one or more embodiments pushes the update to the robots 16 on its own, while in other embodiments, the computer appliance 10 defers to human input as to whether the update gets pushed to the robots 16. Further, in one or more embodiments, the computer appliance 10 may defer pushing map updates to the robots 16 until it detects that the localization quality at one or more of the robots 16 drops below a defined quality threshold. Upon detecting such a drop, the computer appliance 10 in one or more embodiments pushes the most-recent map update determined by it. In other embodiments, the computer appliance 10 does not perform a map update until it detects the drop in localization quality.

Figure 6:
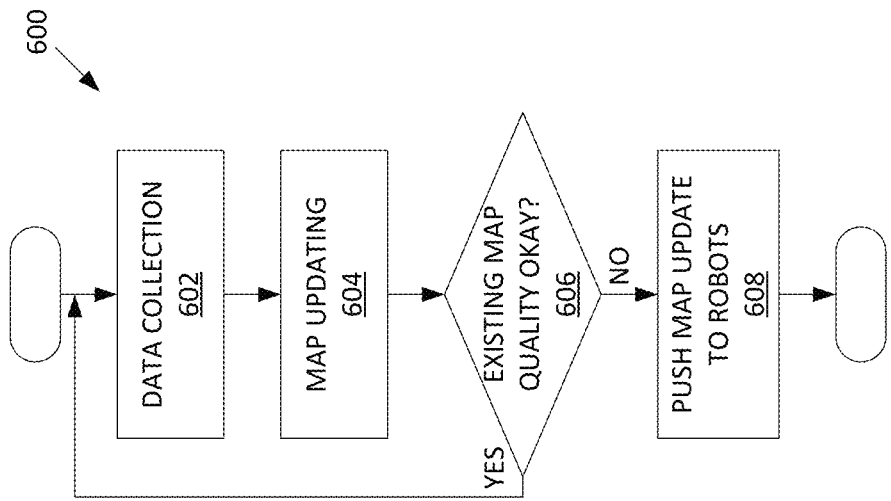
FIG. 6 is a logic flow diagram of one embodiment of conditional map deployment.

FIG. 6 illustrates one example of such operations by depicting a method 600 performed by a computer appliance 10. The method 600 includes the computer appliance 10 collecting (Block 602) logged data 22 from individual robots 16 operating in an environment 14 and performing map updating (Block 604) as a "background" operation. Here, "background" refers to the fact that the update to the map 12 may be carried out while the one or more robots 16 that use the map 12 are operating in the environment 14.

However, rather than unconditionally pushing the updated version of the map 12, the computer appliance 10 determines whether the existing map quality is good (Block 606). Here, this is determined by whether the localization quality being achieved by the individual robots 16 using their current local static copies of the map 12 is sufficient. If so (YES from Block 606), processing returns to the data collection and map updating operations (Blocks 602 and 604).

Upon detecting that the existing map quality is not okay (NO from Block 606), the computer appliance 10 pushes the map update to the robots 16 (Block 608), although in at least one embodiment it requires a confirming input from a human operator to carry out the push. Pushing the map update comprises sending the latest results from the most recent execution of the map updating in Block 604, or sending information derived from those latest results. For example, the computer appliance 10 may send an updated version of the map 12 as the MUI 24, or it may send change data—delta information—that allows each robot 16 to update its local static copy of the map 12 to the latest version.

Figure 7:
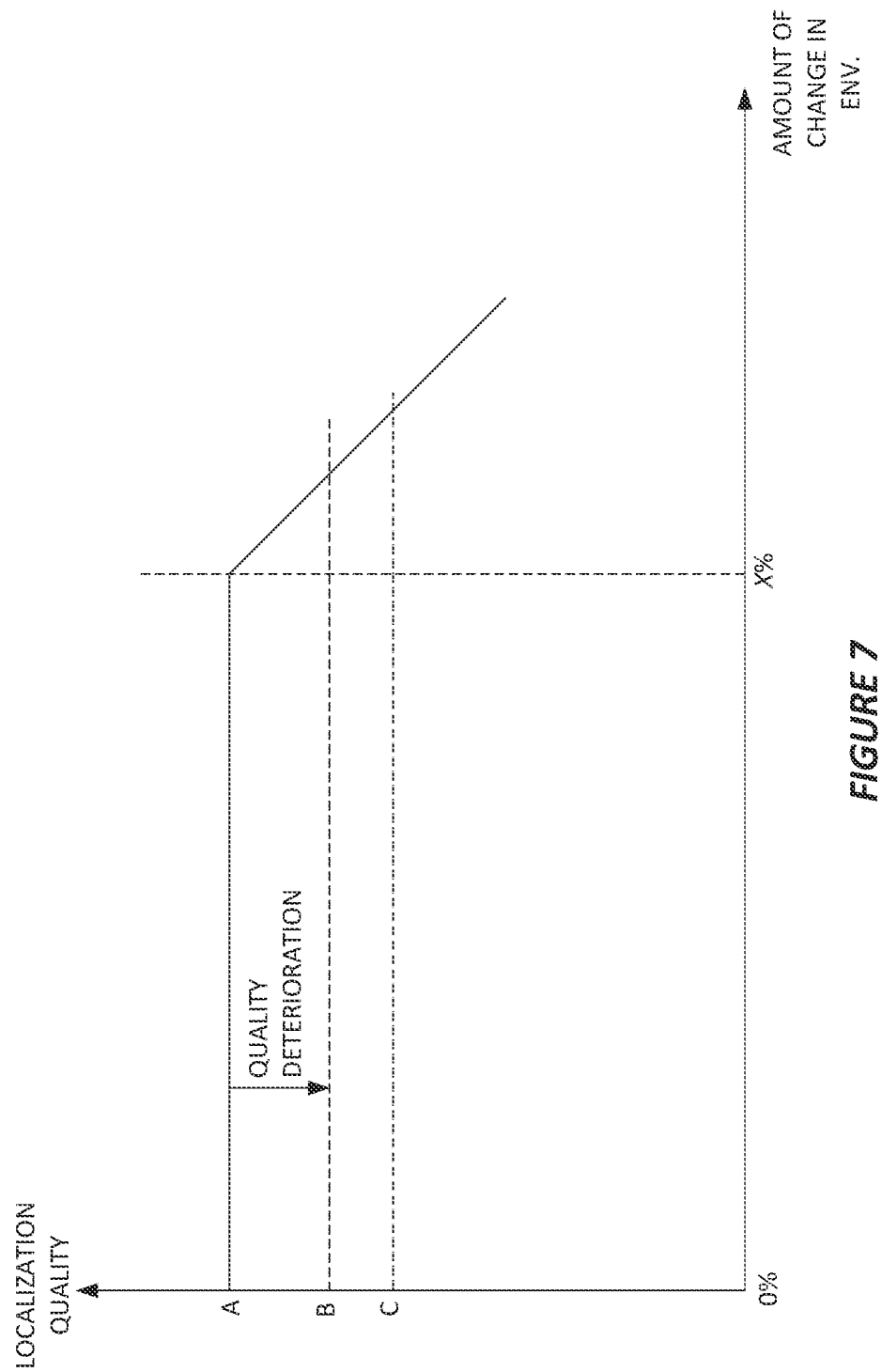
FIG. 7 is a plot of localization quality as a function of deviations between an environment and a static map of the environment used by the robot for performing self-localization within the environment.

FIG. 7 illustrates an example plot of localization accuracy (i.e., difference between estimated pose of the robot and true pose) versus the "amount" of change in the environment 14. "Change" refers to differences between the characteristics of the environment 14 as being sensed by a robot 16 for self-localization versus the characteristics of the environment 14 as represented in the local static copy of the map 12 being used by the robot 16. Localization accuracy remains flat up to some threshold amount of change, with the threshold depicted as "X %" in the figure. Further changes beyond the threshold point result in decreasing localization accuracy. While localization accuracy is typically not a measurable quantity (outside of experiments with controlled conditions), the localization quality gives an indication of localization accuracy. A poor localization quality correlates with the probability of poor localization accuracy (region beyond the threshold—X %). Up until this threshold, while localization quality degrades with the amount of change in the environment, the localization accuracy does not degrade significantly.

This behavior is attained because as long as a reasonable fraction of the map 12 in use at a robot 16 is matched by its observation of environmental characteristics, the location and pose of the robot 16 in the environment is estimated accurately. When matching falls below the aforementioned threshold, there is a significantly accelerated reduction in instantaneous localization accuracy due to uncertainty in robot pose, which results in switching between correct and incorrect pose determinations in a given time window and that can lead to the robot 16 getting "lost" within the environment 14.

Using depicted labels, the "A" accuracy level shown in the figure may be a nominal or starting accuracy level, with the "B" accuracy level representing a threshold amount of accuracy deterioration, corresponding to an equivalent deterioration in the quality level that serves as the decision point for whether map updating is needed for the robots 16 operating in the environment. In one embodiment, the computer appliance 10 decides that MUI 24 needs to be pushed to the robots 16 if it determines that the localization quality at any one of the robots 16 falls at or below the B threshold. A second, lower threshold, shown as "C" in the figure, may be used as the decision point for declaring or imposing an emergency stoppage for all robots 16, or at least for any individual robot 16 whose evaluated localization quality is at or below the C threshold.

Broadly, localization quality is a metric that is computed by all robots 16 independently and individually. In one or more embodiments, each robot 16 uses the localization quality metric as a condition for logging sensor data and, possibly, other data, as the logged data 22 that is used in subsequent map updating by the computer appliance 10. For example, each robot 16 decides whether to log data in dependence on whether its localization quality is below a defined threshold. There is also an average/minimum localization quality for the entire fleet robots that the computer appliance 10 estimates from the individual localization qualities determined by the robots 16. This summary or overall localization quality is used by the computer appliance 10 as a trigger condition for performing a map update, based on the logged data 22 from the robots 16.

Figure 8:
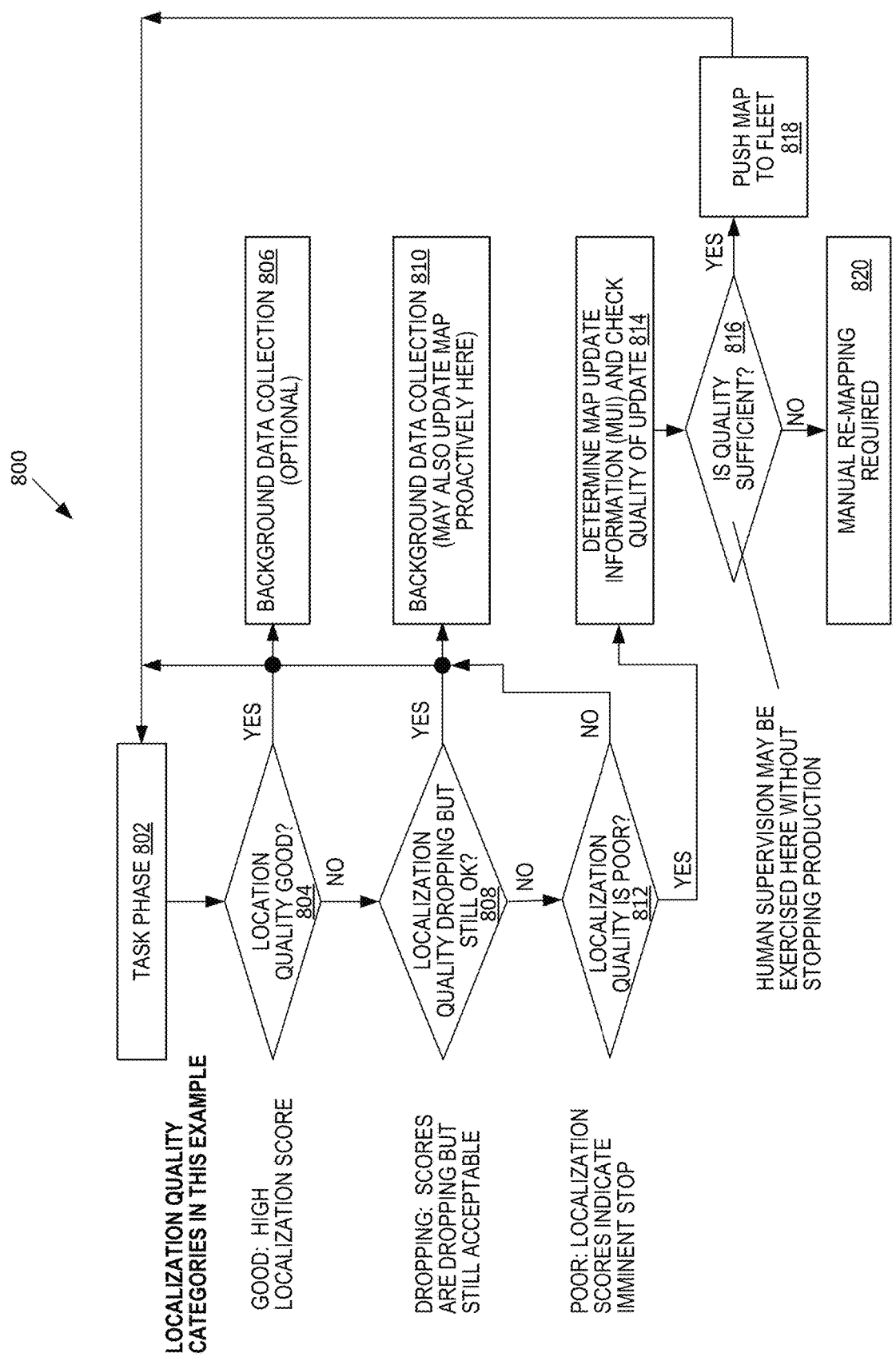
FIG. 8 is a logic flow diagram of one embodiment of a method of operation by a system that includes a computer appliance for updating a map, and individual robots that use static copies of the map to perform self-localization while operating in the environment represented by the map.

FIG. 8 illustrates a processing or operational framework 800 that assumes that individual robots 16 in a robot fleet have been configured with a static copy of a map 12, such as by using a manual update process. The map 12 may have one or more overlaid "update regions" which represent areas of expected map changes. Examples of such areas include loading docks, material staging areas, areas with other mobile machinery, etc.

The "Task Phase" of operation (Block 802) refers to regular autonomous operation of a robot 16 (or robots 16) within the environment 14, such as the robot 16 autonomously navigating within the environment 14 in performance of one or more material transport jobs. The task phase depends on the robot(s) 16 being configured with a local static copy of the map 12.

In one or more embodiments, a robot 16 performing the task phase carries out self-localization within the environment 14 using an onboard Monte Carlo Localizer (MCL). MCL processing uses the current static copy of the map 12 held in onboard memory and estimates the pose of the robot 16, as well as computes a localization quality metric that indicates the ratio of sensor data correspondence with the static copy of the map 12 being used by the robot 16. Additionally, the robot 16 logs the sensor data into archival files. This logging activity is gated by two criteria: (1) the robot must be located within one of the update regions predefined for the map 12, and (2) the localization quality of the robot 16 must be within a certain threshold range.

The decision point for the foregoing Item (2) is represented by the Localization quality good? (YES, From Block 804) in the workflow in FIG. 8. If the localization quality is not good (NO, from Block 804), processing advances to Block 808. If the localization quality is high, then there may be some incremental/transient changes in the environment 14, but the local static copy of the map 12 held in the robot's memory remains a sufficiently good representation of the environment 14. Consequently, the robot 16 collects sensor data, shown in FIG. 8 as "Background data collection" (Block 806) that can be valuable to observe the incremental changes. Conversely, when the localization quality is low, this means that the static copy of the map 12 held by the robot 16 does not accurately represent the real environment and a map update will likely be beneficial.

A subsequent decision is made, represented by "Localization quality dropping but still OK?" in the workflow (YES from Block 808). If the localization quality is not okay (NO from Block 808), processing advances to Block 812. The localization score is compared against a second threshold. If the localization quality is dropping but still sufficient for the robot 16 to complete tasks, the robot 16 can continue to operate as normal while maintaining Background data collection (Block 810). Optionally, the computer appliance 10 may begin the time-consuming process of computing a map update with the data collected thus far from the robot(s) 16, so that a higher quality map can be available as soon as possible.

Alternately, if the localization score is so low as to compromise the fleet's operation (i.e., robots 16 will imminently become lost and stop), then the robot Localization quality is poor (YES from Block 812). If not (NO from block 812), processing returns to the task phase 802. On the YES path from block 812, map updating is required to restore the fleet of robots 16 to operation. Localization on the robots 16 is turned off, so is the data logging and serving of the last map for the localizer (i.e., all these components are turned off). But, most importantly, the map update process is triggered. The computer appliance 10 uses the available localizer data 22 to determine MUI 24 (Block 814) and a corresponding quality check of the map update may be performed.

In particular, the map update algorithm takes as input all of the logged data 22 that has been collected thus far, encompassing observations of incremental changes in the environment, and computes a new version of the map 12 for the fleet of robots 16 that include the detected changes, using a map update process. In at least one embodiment, the map update process is a "multi-modal, multi-unit batch-optimized" update process, meaning that it accounts for, or otherwise reconciles logged data 22 collected for multiple modes of the environment 14, and for the fact that the logged data 22 may include data from different robots 16, and for the fact that the logged data 22 is processed in batches that is "offline" and subsequent to the live localization operations that resulted in generation of the data. The update process may be referred to as the "BOMU," denoting "batch-optimized map update."

In one or more embodiments, the BOMU is a batch-optimized SLAM algorithm. "Conventional" SLAM, wherein a robot performs localization and mapping simultaneously while navigating within an environment, may be able to maintain a certain level of localization quality despite environment changes. However, the batch-optimized SLAM disclosed herein achieves the higher quality of static mapping that is robust against the risk of complete loss of localization and breakdown of map updating that is present with conventional SLAM, where localization and map updating are performed together, on a continuous basis. The nature of continuous SLAM also makes it impossible for a robot 16 to determine precise goal points and execute corresponding path planning behaviors.

In further contrast to batch-optimized SLAM, continuous SLAM typically only looks at a small (running) time window of the most-recent sensor data, to make decisions for filtering observation data. Therefore, continuous SLAM is vulnerable to noise and dynamic artifacts and may include such noise and artifacts erroneously in the map. Additionally, continuous SLAM causes drift in landmark locations in the map with respect to the true measurable coordinate system of the world in which the robot. Continuous SLAM processes also have much tighter computational requirements than the batch-optimized SLAM described herein, because continuous SLAM is responsible for providing high-frequency pose updates to the robot 16 during live operation of the robot 16 within the environment 14.

With batch-optimized SLAM, the robot(s) 16 perform real-time or near-real time localization but the responsibility for map updating is "offloaded" to the computer appliance 10. Therefore, the computer appliance 10 is free to implement longer or more elaborate filtering of the data and consider multiple data sets from multiple robots 16 for multiple modes of the environment 14. Performing batch-based SLAM in this manner, offline at the computer appliance 10, allows for more complex or exacting SLAM processing, which gives rise to a higher-quality set of map updates than would be achievable within any given robot 16 performing continuous SLAM as is conventionally known.

Turning back to the framework depicted in FIG. 8, the quality of the new map—i.e., the updated version of the map 12—generated by the computer appliance 10 using the BOMU is assessed in Block 816. In one or more embodiments, the assessment is both programmatic (i.e., a confidence measure determined by the computer appliance 10) and subjective (i.e., by a human operator). Note this map computation and assessment can be done as a background process without disrupting the normal operation of the robots 16 and stopping production, at least when such operations are done in advance of localization quality falling to some critical threshold.

If the quality is found to be sufficient (YES from Block 816), then the computer appliance 10 pushes the MUI 24 to the fleet of robots 16 (Block 818), which robots 16 then use the MUI 24 to update their local static copies of the map 12.

However, if the assessed quality of the newly updated map is insufficient (NO from Block 816), then manual re-mapping of the environment 14 is required (Block 820).

The responsibility of executing the workflow is shared between the robot(s) 16 and the computer appliance 10. In one embodiment, the computer appliance 10 continuously downloads archival logs of logged data 22 from individual robots 16 in the fleet (the output of Background data collection operations). The computer appliance 10 tracks when robots 16 enter and exit any of the predefined updater regions and what localization scores they report for those regions. The computer appliance 10 may choose to call the BOMU for a map update once the filtered average (or minimum) localization score drops below a certain threshold. Alternatively, the computer appliance 10 repeatedly calls the BOMU, e.g., at set intervals, but merely stores the results as long as the localization score is high. Continuously calling the BOMU is an implementation-dependent detail but doing so could be desirable to make the computation more efficient, since each update process will need to work on smaller datasets—i.e., smaller batches of logged data 22—and incorporate smaller changes. Note that while the presented map update process is well-suited to mobile industrial robots, the technique can also be applied to other frameworks such as drone networks, cell-phone networks with a shared visual positioning system (VPS), etc. Hence, the robots 16 may be understood broadly as some kind of end units that contribute logged data 22.

In one or more embodiments, the map updating framework disclosed herein uses a particle filter-based SLAM framework, enabling updating of the map 12 by the computer appliance 10 using logged data 22 generated during task-phase operations of one or more robots 16 within an environment 14 represented by the map 12. The framework generates map updates identifying incremental and periodic changes to the environment and provides the deployed fleet of robots 16 with the most accurate map, using the sensor observations recorded by the robots 16 while operating within the environment 14, up to the point of the map update generation. These sensor observations are captured in the respective logged data 22 provided by individual ones of the robots 16.

Understanding of the advantages gained from the disclosed technique may be aided by viewing the map updating as an "offline" or "parallel" process, meaning that the data processing and computations performed to arrive at an updated version of the map 12 happen at the computer appliance 10, while the involved robots 16 can continue operating within the environment 14 using their current copies of the map 12. Because of this arrangement, in comparison to conventional SLAM processing in a single robot, the contemplated map updating can consider more data over longer time frames, and from more than one robot 16 and using more elaborate filtering and processing.

Map regeneration and/or pushing the latest map updates to the robots 16 occurs, for example, in response to the average/minimum localization quality dropping past a certain threshold, where each of the individual localization quality values are achieved by individual robots 16 while operating in the environment 14 using their static copies of the map 12. Updating those local static copies of the map 12 based on the latest map updates determined by the computer appliance 10 resets the localization quality substantially back to that of a newly generated offline map. Furthermore, these map updates are generated not from a laborious manual process but rather using the logged data 22 that the robots 16 generate while working in the environment 14.

Because it is likely that robots 16 are expected to work in a similar space further down the line, incorporating their observations into an updated version of the map 12 improves the robot's self-localization performance.

The overall map updating framework may be viewed as a hybrid split, where the robots 16 generate logged data 22 during "normal" operations within the environment 14 and where the computer appliance 10 aggregates or otherwise collects the logged data 22 for batch-based processing, to determine the latest map updates.

Changes in the environment may be incremental. A typical example is the case of pallets and boxes being moved incrementally on a shop floor (these are usually manually moved and roughly aligned with floor markers) over short or long time horizons with poor repeatability. The localization performance of robots 16 in the fleet can start to degrade once the incremental changes are too large to be ignored during the localization process performed by individual robots 16 operating in the affected areas. Using the map update process, it is possible for robots 16 to use structures corresponding to incremental changes that were incorporated into map updates to keep the robots 16 well-localized, as long as these changes are not drastic. Typically, one can expect the map update process to tolerate over 100% changes over the fixed base map, as long as the incremental change between re-visits observing the changes is less than −30%.

Alternatively, changes in the environment could be periodic. Such changes are typical of a warehouse or shipping center, where, for example, in the morning (say 9:00 AM), boxes for shipping are ready at the dock. Once loaded into shipping trucks by the afternoon (say 4:00 PM), the map of the environment 14 looks very different than in the morning. The next day, boxes for shipping are back in the dock at 9:00 AM. These periodic map changes typically occur every day, or according to some other pattern. Similar long term map-change behaviors and histories can happen with gates, doors, and other structures in the environment 14. The map update process described here can generate multi-modal map representations, where each mode represents a characteristic configuration of the environment 14, and hence can characterize periodic changes in the map for optimal localization throughout the day and over longer time horizons. Hence, modality is an important attribute in characterizing environment changes with respect to the map 12.

In other scenarios, changes in the environment 14 can be wholly dynamic. In these scenarios, changing structures dominate the scene. An example of this domination occurs when the only structural features that a robot 16 observes in a "dead zone" are movable objects (such as pallets in a warehouse), whereas the local static copy of the map 12 in use by the robot 16 for self-localization was created with no movable objects in the involved area or region of the map 12. Conventionally, repeated re-mapping is required to keep a robot localized in such conditions. However, because the map update process disclosed herein can work off features from dynamic objects (movable), it can characterize such changes as part of the map and hence the resulting localization is robust to such changes, as long as changes are not too drastic and at least a minimal number of obstacles retain their pose between map updates.

As noted, the map update process takes the form of a decoupled process—i.e., the updating is decoupled from ongoing, normal operation of the individual robots 16—and is driven by a BOMU carried out by the computer appliance 10. In at least one embodiment, the BOMU is a batch-optimized SLAM algorithm that generates updated version of the map 12 using logged data 22 from one or more robots 16. In at least one such embodiment, the logged data 22 from each robot 16 includes data from a Monte Carlo Localizer (MCL) function running on the robot 16 and environmental sensing data and odometry data. The data from the MCL function comprises, for example, pose data computed in dependence on the environmental sensing data and odometry data.

Here, the MCL function determines the robot's position within the map frame. The MCL function may be substituted with other types of localization algorithms, depending on the particular design and operational requirements in play. In at least one embodiment, the self-localization in the robots 16 is particle-filter based MCL and the batch-optimized SLAM carried out by the computer appliance 10 is a particle filter-based SLAM algorithm. In at least one embodiment, the particle filter-based SLAM algorithm implemented by the computer appliance 10 is a Rao-Blackwellized particle filter algorithm. While the localization operations at the robots 16 and the map update process at the computer appliance 10 are not limited to the use of particle filters, particle-filter-based implementations offer certain performance and quality advantages in at least some scenarios.

Figure 9:
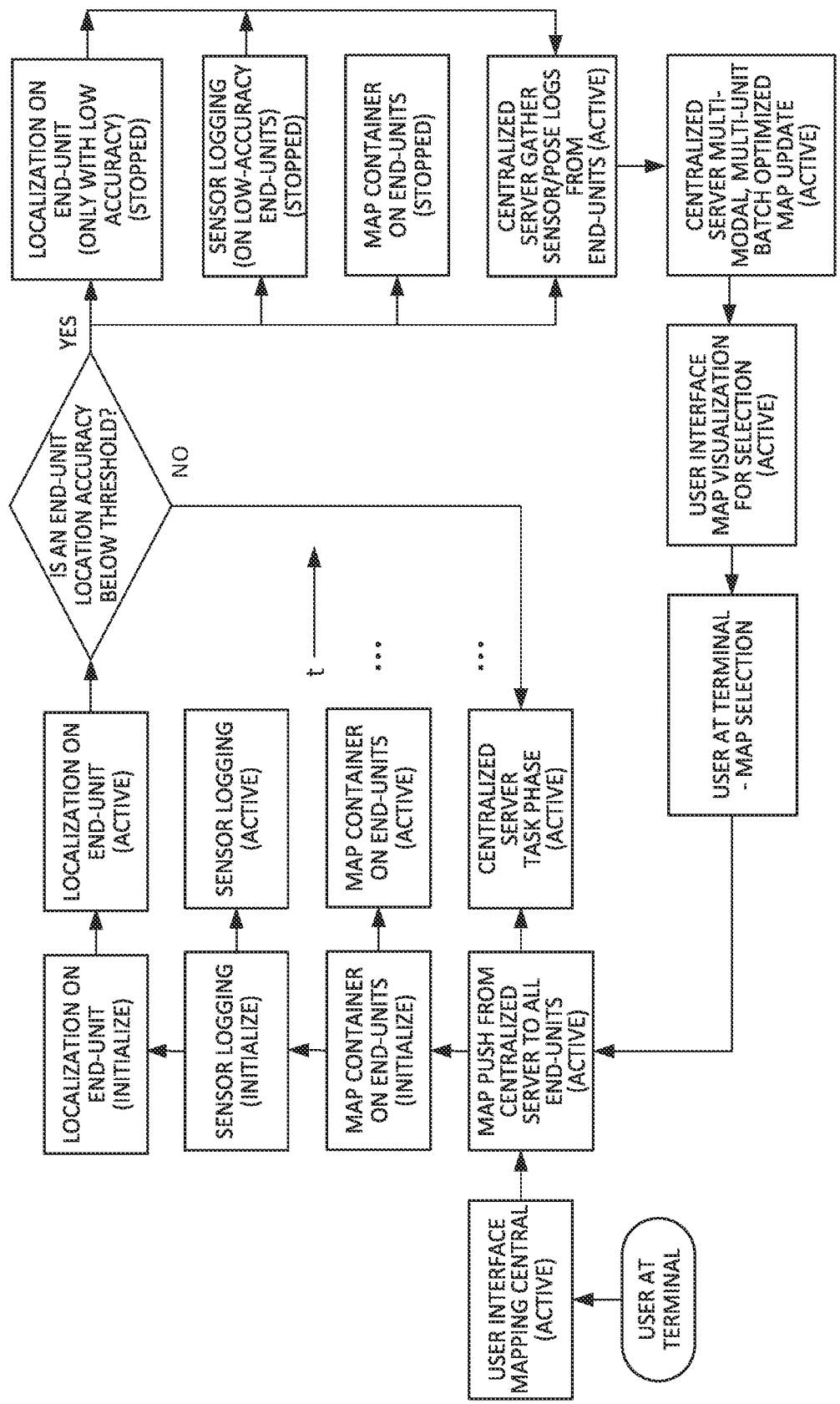
FIG. 9 is a state diagram of one embodiment of a method of map updating, responsive to certain inputs from a user.

FIG. 9 is a state diagram of the map updater process according to one embodiment, where "end-unit" refers to essentially any type of robot 16 that uses a local static copy of a map 12 for self-localization within an environment 14 represented by the map 12. As seen, if the localization quality—or equivalently, as expressed here as a "location accuracy"—of an end-unit drops enough that the fleet's operation is halted or imminently in danger of being halted, the computer appliance 10 calls for a map update from the BOMU. The computer appliance 10 executes the BOMU using log files-logged data 22—that is relevant to the time and area within the environment 14 where the degradation in localization quality occurs.

Consider an example of two robots 16, denoted as robots A and B, operating in a three-room environment. The corresponding map 12 has three regions, one for each room. In this example, during a time period 't0', Robot A is exclusively within Region 1 and Robot B is exclusively within Region 3. During a time period 't1', Robot A is within Region 1 and Region 2, and robot B is within Region 3 and Region 2. Robot A repeatedly achieves a localization score of 0.5 while Robot B achieves a localization score of 1.0. Therefore, the average localization score of Region 1 is 0.5 (coming only from Robot A) and that of Region 3 is 1.0 (coming only from Robot B). The average localization score of Region 2 however, may be computed as 0.75 (a time weighted average of Robot A and Robot B). The set of log files for each region of the map 12 consists of logged data 22 from robots 16 located in that region. For instance, note that map update for Region 2 does not contain any files from time period 't0'.

Map updates may be triggered using localization quality averages or using the individual localization quality (score) for respective robots 16. As noted, the logged data 22 from each robot 16 at least includes sensor data logged by the robot 16 from one or more types of sensors used by the robot 16. The sensor data may include odometry data used by the robot 16 in performing self-localization. Further, the logged data 22 may include the localization processing results, e.g., output produced by the robot's self-localization algorithm using the sensor and odometry data.

The map update process undertaken to generate a new version of the map 12 may be time consuming. However, as noted before, one advantage is that the robots 16 can continue normal operations in the environment 14 using their current copies of the map 12, while the computer appliance 10 determines a map update.

Once the map update is completed and an updated version of the map 12 is generated—e.g., a new map file is generated—the results may be pushed to the robots 16 or, in at least one embodiment, presented to a human operator for assessment of whether the updated version of the map 12 has sufficient quality. In this case, the operator has four options: (1) the operator determines that the map quality is insufficient to deploy to the fleet and rejects the map in favor of performing a manual remapping process; (2) the operator determines the map quality is insufficient to deploy to the fleet and rejects the map, and the fleet continues operating and a new map will be generated with more recent logged data 22; (3) the operator determines the map quality is sufficient but does not include enough extra information to warrant stopping the fleet and sending the map update, meaning that the changes in the map 12 are deferred to the next update; and (4) the operator determines the map quality is sufficient and the included changes are required to be immediately sent to the fleet, meaning that the fleet of robots 16 is stopped and all robots 16 are updated with the new version of the map 12 and then resume task operations in the environment 14 using the updated version of the map 12.

Figure 10:
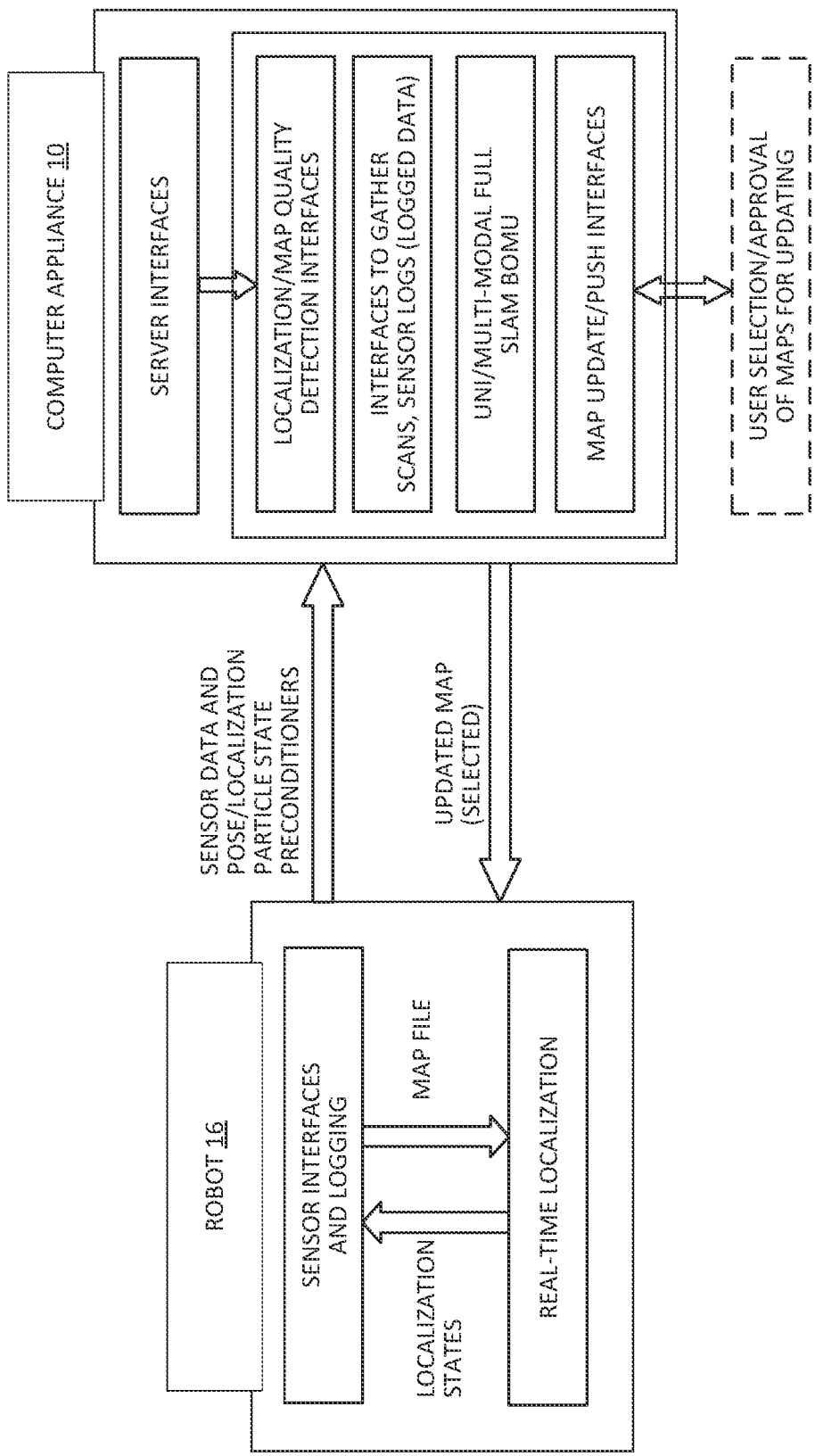
FIG. 10 is a block diagram of functional units or processing modules and associated data at a robot, also referred to as an end-unit or autonomous intelligent vehicle (AIV), and a computer appliance, also referred to as a computer server.

FIG. 10 depicts a functional system diagram of the framework in one example, for supporting the map update process. The "Sensor Interfaces and Logging" block comprises the robot software responsible for gathering relevant sensor & localizer state data from the real-time localizer (that primarily drives the functioning of the robot 16 during task-phase operations), writing it to log files, compressing, and making available for the computer appliance 10 to collect via a communication interface.

The real-time localization block (function) of the example robot 16 represents a localization algorithm which provides a pose of the robot 16 relative to the static copy of the map 12 that is in use at the robot 16 for self-localization within the environment 14 represented by the map 12. In one or more embodiments, the robot 16 implements this functionality using an MCL function. In at least one such embodiment, the pose determinations, as well as the internal algorithm state information, constitutes all or a portion of the logged data 22 provided to the computer appliance 10 for running the map update process.

The "Server Interfaces" block at the computer appliance 10 represents functionality that interacts with the underlying network stack that executes on the computer appliance 10 or on an associated computer system that serves as a "fleet server" responsible for dispatching the robots 16 for performance of tasks. In either case, the computer appliance 10 receives or retrieves the logged data 22 directly or indirectly from the robots 16 and pushes MUI 24 generated by the Full SLAM BOMU directly or indirectly to the robots 16.

The "Localization/Map Quality Detection Interfaces" block at the computer appliance 10 determines the average/minimum localization quality and positions within the map 12, from values for the individual robots 16, and in one or more embodiments uses such determinations to ascertain whether a map update is necessary.

The "Interfaces to Gather Scans, Sensor Logs" block at the computer appliance 10 represents one or more functions implemented at the computer appliance 10, whereby the computer appliance 10 is operative to retrieve, organize, and process logged data 22 from the robots 16.

The "Map Update/Push Interface" block at the computer appliance 10 represents functions that are invoked for pushing MUI 24 out to the robots 16.

The "User Selection/Approval" block at the computer appliance 10 represents functionality at the computer appliance 10 whereby the computer appliance allows user interactions to accept or reject updates to the map 12. The user is also allowed to select modalities of the generated maps for deployment. This functionality also enables the user to select map updater regions and/or to ignore superfluous modes.

The "Multi-modal Full SLAM BOMU" block at the computer appliance represents a core map updating functionality according to one or more embodiments. In at least one such embodiment, this block is implemented as a Rao-Blackwellized particle filter with Global Optimization which performs a full SLAM update to determine a new version of the map 12 from the currently available logged data 22. The block presents a number of distinctions over conventional SLAM, even conventional SLAM based on particle filters.

Firstly, the block runs a version of full SLAM that is configured for multi-modal map generation and map management and it is configured to provide the following types of updates: (a) a single map update where only one map mode is generated, as per applications requirements, reflecting the assumption that changes in the environment 14 are permanently incorporated and not periodically varying (this operation can accommodate incremental changes); (b) a multi-modal map update, where the map update process produces more than one updated version of the map 12, with each "version" representing a different mode of the environment 14. As such, the MUI 24 pushed to any given robot 16 may include multi-modal updates, meaning that the robot 16 receives updated versions of the map 12 for more than one mode of the environment 14, such that the local static copy of the map 12 that is updated by the robot 16 using the MUI 24 comprises two or more modal maps, with the robot 16 subsequently using the modal map that corresponds with the environment mode that is applicable (e.g., time of day, day of week, etc.).

Additionally, the BOMU implemented by the computer appliance 12 offers further points of distinction, such as: (1) being operative to save and load internal particle states (including pose along robot trajectories and probabilistic occupancy grids for each particle) to an existing map file, thus preserving map update states across runs; (2) implementing a hybrid process that includes (i) a decoupled SLAM process with the localization happening online in the robots 16 and the map updates happening offline—i.e., external to the robots 16 and in parallel with or independent of the robots 16 performance of ongoing task operations within the environment 14—and (ii) a coupled SLAM process with both happening simultaneously in an offline process. While in a traditional SLAM pipeline, it is possible that the current best map's world coordinate system (as associated with a particle) can deviate significantly from that of the base map. This is due to the inherent nature of SLAM where errors or drifts in localization manifest as deviations of map coordinate from the world coordinate, which results in further deviation or drifting of localization estimates from the world coordinate. It is possible to use the MCL particles to counter this. However, MCL particles are in general noisy and jumpy and do not provide for a smooth trajectory estimation that is crucial for a clean map update. Furthermore, since robots in the task phase are typically operating close to their top speeds, the MCL particle state estimates are sparse and contain a large range of instantaneous/transient errors. Hence, a "mapping using known poses" approach is not viable. To counter this, we use a hybrid motion model for SLAM based update of maps that combines cloned MCL particles (which typically have low drifts or world coordinate errors but are noisy and jumpy) and independently evolving particles that are smooth and locally more precise but suffer from drifts.

Figure 11A:
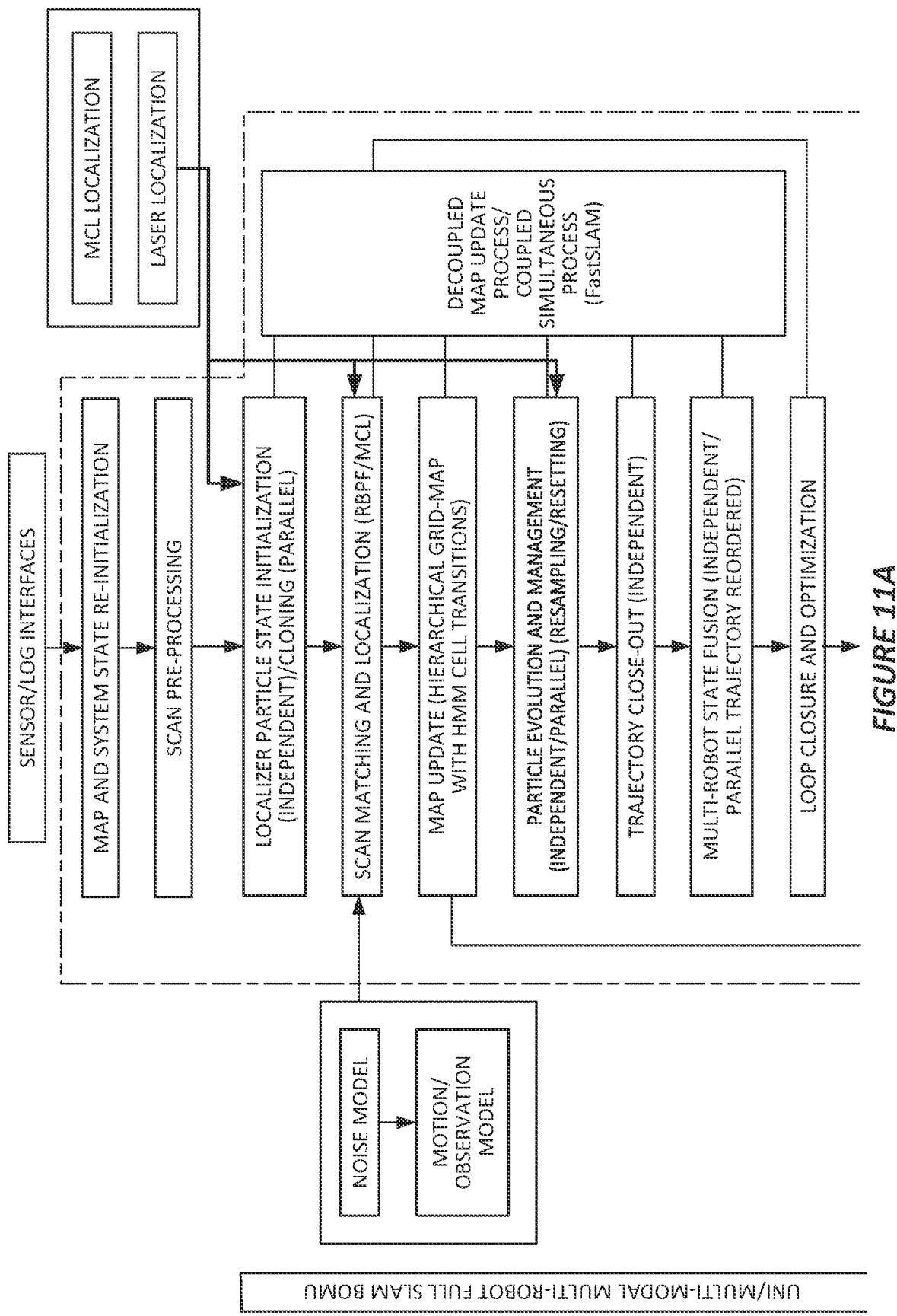
FIGS. 11A and 11B are logic flow diagrams detailing one embodiment of the Full SLAM BOMU introduced in FIG. 10.
Figure 11B:
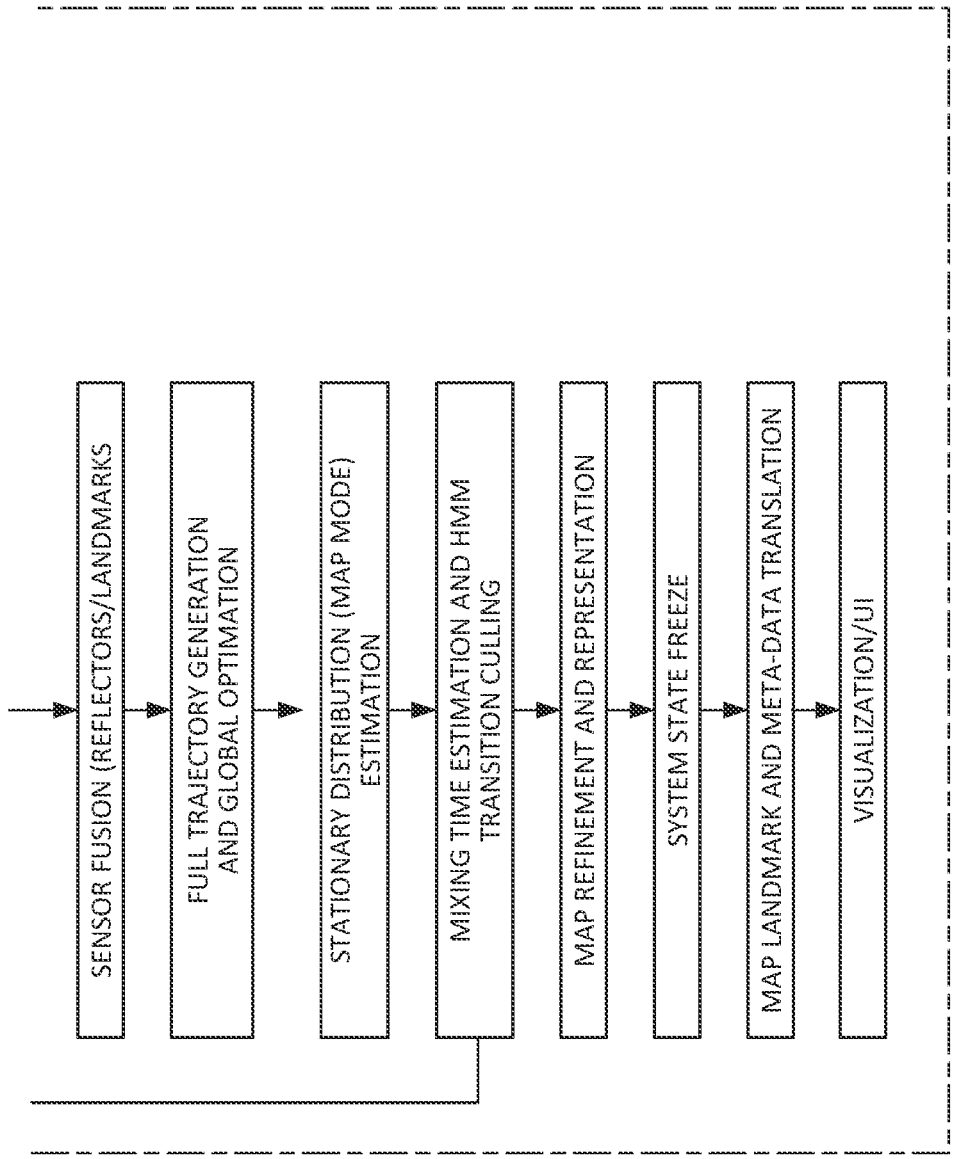

Such BOMU functionality appears in FIGS. 11A and 11B, which together represent one example implementation of a batch-optimized SLAM implementation of the BOMU at the computer appliance 10. Notable functional blocks appear in FIGS. 11A and 11B, outlining a particle-filter based map update process that is supported by global optimization of estimated trajectories from respective robots 16 to generate an updated version of the map 12. The functionality of the core map update blocks in the context of the full SLAM pipeline is described below. Note that in terms of software design, this framework is integrated to run on the computer appliance 10 operating as a separate Map Updater Server that can live on an independent PC/IPC, an Edge instance or in the cloud, enabling scalability and flexibility in deployment of the framework.

A particularly notable feature of the BOMU in this embodiment is a particle evolution model, which relies on a motion model. While the motion model for the evolution of particles in a typical particle filter SLAM pipeline uses an odometry-based motion model, in the BOMU, a hybrid approach is used. Here, the state estimation process is a novel hybrid of a 'Decoupled Map Update Process' and a 'Coupled Simultaneous Localization and Map Update Process'. While the 'coupled process' estimates the localization and the map update steps iteratively and simultaneously in an offline manner, the decoupled process separates the localization and map update steps, with the localization happening in the online phase as part of task phase operation of the robots 16—with robots 16 performing localization using an MCL particle filter—and the map update happening in an offline phase at the computer appliance 10. Effectively, this approach is neither an online SLAM version, nor an offline SLAM version, but rather a hybrid map update process, where only the coupled process is simultaneous.

As such, the particle evolution follows a fate that is either independent (coupled process; with its own resampling/resetting processes) or parallel (decoupled process; cloning the MCL particle evolution). As described earlier, the hybrid evolution model (and corresponding motion model) is key to handling the map update using logged data 22 from a variety of task phase localization conditions, while maintaining the overall integrity and world-frame grounding of the map 12 that is being updated. While cloned particles keep particle diversity low, independent particles enhance diversity, and particle management keeps the balance between the two while constraining particles. This model is suitable for single robot map update processes, while being applicable to multiple robots as well.

Traditionally, online SLAM particles distribute errors between localization and map update processes, every localization drift results in the generated map diverging from the world coordinate, resulting in a compounding of errors and drift of fixed locations like goals which are extremely critical in industrial environments. These goals are required to be located with high fidelity. On the other hand, MCL particles that reference a fixed world coordinate map are ideal for map updates because they do not exhibit any drift and can maintain goals and other fixed landmarks. However, all errors in the process (coming in from sensor noise or actuation errors) are reflected in the localization. MCL particles and corresponding localization can be noisy, jumpy and can increase the incidence of sudden and potentially irretrievable loss or lowering of localization and hence impede the map update process. Thus, some independent evolution of particles with optimization of particle state based on sensor observations (as is done with SLAM particles) is necessary.

Another significant deviation from a standard single-robot online SLAM pipeline is the introduction of a "trajectory close-out module" in the BOMU used by the computer appliance 10. This module is responsible for the management of sensor streams from multiple robots 16 that overlap in terms of observations (and time of observations) and may or may not contradict. These contradictions could come from the noise in the localization (as a function of sensor noise model differences in the respective robots 16, and more importantly, the MCL state noise/error from sub-optimal scan-matching). Here, "scan matching" refers to the degree of correlation between the sensed environment as represented in the robot's sensor data and the local static copy of the map 12 being used by the robot 16.

Put simply, scan matching is an assessment of how well the robot's sensor data at any given instant matches a portion of the map 12. For example, the robot's sensor data, which may include "point clouds" obtained from 2D or 3D LIDAR scans that allow the robot 16 to detect obstacles and openings, such as wall and door features, and these detected features may be compared to the arrangement of features captured in the robot's local static copy of the map 12.

Contradictions in the logged data 22 from respective robots 16 also arise from temporal changes in the environment 14. The map update process is heavily weighted in favor of recency (in observations, i.e., the most recent changes need to have a greater impact on the output map, compared observations from back in time). This is a characteristic of incremental and wholly dynamic changes. Thus, it is desirable to apply sensor logs from multiple robots 16 in the order of their observation (in time) in a casual manner to the map update process. However, it is also desirable to maintain consistency of trajectories (and to support loop closures)—hence, it is desired to retain particle evolution for sensor data time steps from a single robot. Thus, these requirements are complementary.

Frequency in observations is also an important consideration, but this is expressly handled by the Hidden Markov Model (HMM) module. The trajectory close-out module handles temporal and noise variance discrepancies and fuses observations by computing bounds on the particle evolution process to close out trajectories. However, trajectories can be closed only at stable points where no potential loop closures or particle divergence is possible. This is achieved by determining the deviation between the coupled state and decoupled state (along with the localization score and modality count of peaks, as reported by the decoupled state), by allowing for trajectory close-outs when the two sets of states concur. Given a trajectory close-out corresponding to the particle state from observations from one robot, the observations from a second robot with an overlapping time and observation sequence can then be used to update the map along this trajectory, before closing out this trajectory and switching to observation sequences from other robots. Finally, the observation sequences from the first robot, but later in time than the first trajectory are incorporated into the map update process.

The trajectory close-out, thus, maintains trajectory consistency of observations by closing out trajectories from multiple robots based on specific constraints, while ensuring causality and recency of map update behavior. Effectively, the trajectory close-out module balances 'trajectory consistency' against 'recency/causality' of observations.

Some of the considerations detailed in the previous paragraph in terms of contradictions between map update observations (that can potentially lead to artifacts such as broken linear structures—e.g., walls) are further mitigated by the Multi-robot State Fusion/Global Optimization and Map Refinement modules. In the case of the global optimization process, using a relative pose factor, diverging pixel occupancy observations from multiple robots 16 are smoothed in a non-linear optimization process, resulting in a convergence of the position estimate of the diverging observation. The map refinement process also enables improving consistency of observations from multiple robots by refining pixel occupancies into line segments, filling up discontinuities and breaks in observations. These modules as part of the integrated system are discussed in detail, below.

Map and System State Initialization

An underlying assumption for the typical or conventional online SLAM pipeline case is an unknown world with a fixed origin that provides for initiation of the online mapping process. Conversely, with the contemplated map updating, it is necessary to initialize the SLAM based update process, (and hence the SLAM state) with respect to a known representation of the world (a map), which has already been deployed on the robots 16 for task phase operation (with localization). Thus, the BOMU at the computer appliance 10 includes a module or function that is responsible for converting the world representation (a metric map) into an occupancy grid in SLAM coordinate space. Note that while maps (in the world space) are usually represented in a plot coordinate system, the occupancy grid uses a binned image coordinate system (thus flipping the vertical axis and repositioning the origin). Additionally, the occupancy grid used in the contemplated SLAM pipeline maintains a symmetric axis span for efficient memory management. The map initialization process converts the probabilistic free-space grid map generated by the typical SLAM based mapper (the fixed base map) into an occupancy grid and initializes the state of the maps for all particles in the state estimate filter with this map. The module also re-initializes system state variables that preserve the state of the SLAM process between instances of map update.

Particle State Initialization and Cloning

As mentioned earlier, the map updater uses a hybrid motion model for SLAM based update of maps. Along with the Particle Evolution module, this module represents the most significant deviation from a typical SLAM pipeline. In addition to the best estimate pose of the robot, as defined by the MCL localizer during the task phase, the hybrid model consumes the decoupled localization particle states of MCL. Interfaces are built into the MCL at the robot 16 to support this behavior, with the state logger logging this information in the log files for processing by the computer appliance 10. Note that this includes all variables pertaining to the MCL particle states—primarily estimated pose of the robot (position and heading) for each particle, the best among the particles, particle distribution information, peaks, localization scores, likelihood, probabilities, along with laser scan data used in the particle fit computation etc. This module reads and initializes the hybrid particle filter. Corresponding to the coupled and the decoupled update processes, the motion model for evolution of particles uses an independent odometry based motion model (similar to online SLAM), and a parallel evolution model, respectively.

It can be seen that while the MCL particles are much more numerous (typically in the thousands, as the process to compute MCL particle states involves only a validation of a localization state and is cheap—hence can be computed with fewer resources), these particles are tightly centered around the odometry estimate, and are suited for precise navigation conditions. They also lack diversity due to aggressive resampling. On the other hand, the independent SLAM particles are fewer (typically in the tens, as the process to compute SLAM particle states involves an expensive optimization of localization/pose and is followed by a map update), but such particles are allowed to spread or deviate over a wider range (to accommodate for errors in localization as well as jumps in updated map coordinates).

Additionally, a null model is used for handling certain use cases, as discussed later. Specifically, a scan-synced best particle estimate from the MCL, along with its probability score and likelihood, is cloned into a particle of the parallel evolution model. Similarly, a limited best set of resampled particles forming peaks in the MCL particle distribution is cloned into additional particles of the parallel evolution model. Finally, this is augmented by additional particles corresponding to resampled MCL peaks but distributed further away from the central peak. This is done to improve diversity of particles. As seen from FIG. 12, the diversity and modality of MCL particle distribution under typical operation can be low with a fixed map (subject to accuracy considerations). This is especially true in cases where a loop closure behavior would otherwise enable successful re-localization. The odometry based motion model helps circumvent such situations through the independent evolution and coupled localization and map update process. This uses the best estimate of the robot's pose by the MCL (this could be from scan-matched estimate or from odometry interpolation) in tandem with a coupled motion model to evolve particles. It is also seen that MCL particles exhibit discrete jumps.

Figure 12:
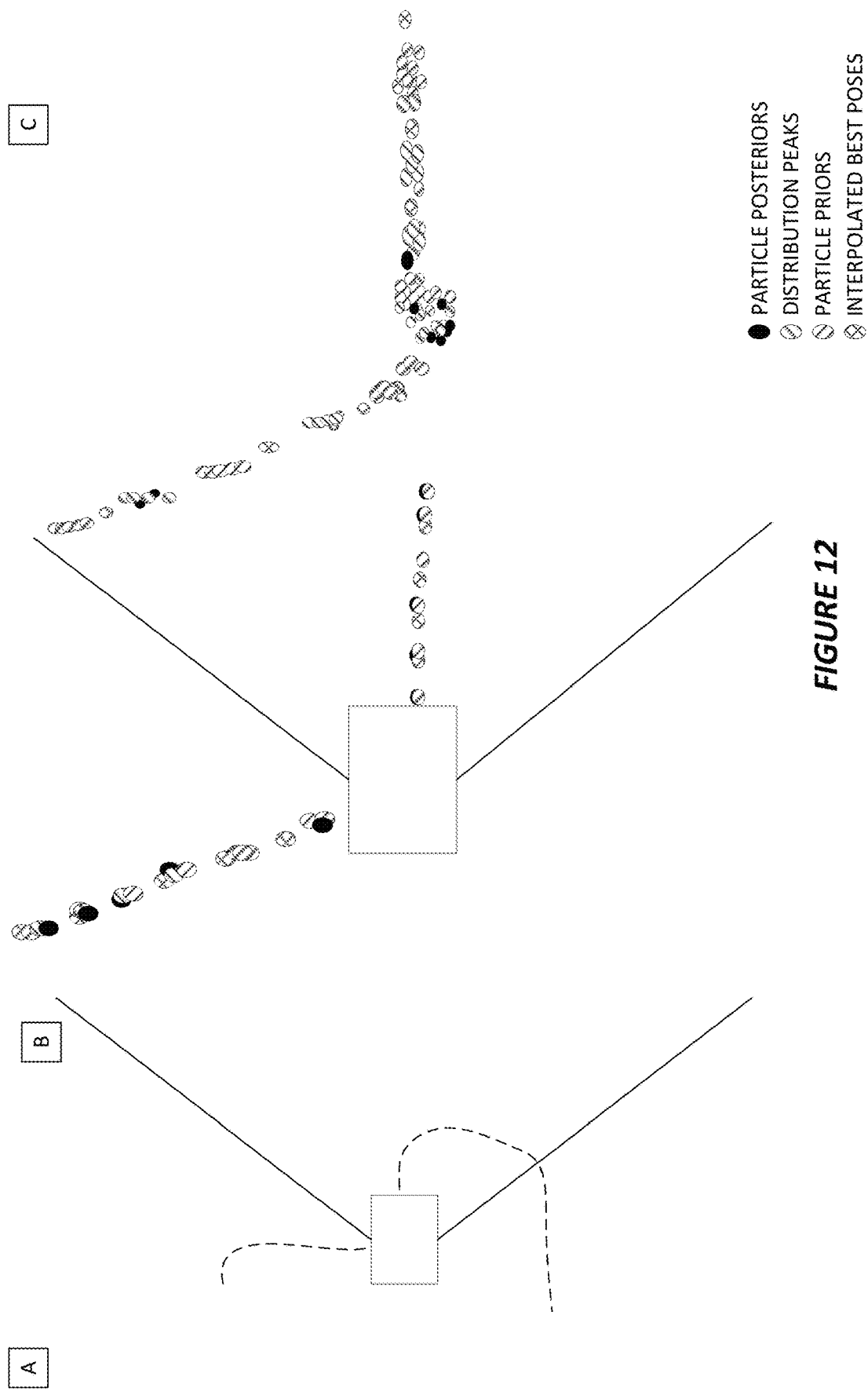
FIG. 12 is a plot of example particle states during self-localization.

Referring momentarily to FIG. 12, the diagram depicts a simplified view of particle evolution during task phase localization in a robot 16. Particle priors are weighted according to probability, but the diagram makes no attempt to depict probability weightings nor depict the actual number of particles. Particle posteriors refer to the states of the particles after scan-match correction, whereas distribution peaks are resampled peaks. The diagram also shows interpolated best poses, which are odometry corrected. Panel A shows the trajectory of a robot 16 across a 20 m×20 m space, from top to bottom, as suggested by the dashed-line trace. Panels B and C are meant to suggest "zoomed in" views of particle states. Note the following: (i) priors lag behind posteriors and particle spread is largely oriented in the direction of motion during translatory motion (top half of plots); (ii) particle spread is more circular due to heading ambiguity from poor rotational odometry, but without lags (center of plot); (iii) also distribution of particles through both motions is typically unimodal and lacks diversity due to aggressive resampling (iv) reported best pose leads particle pose due to interpolation. All or some of the particle data depicted in FIG. 12 may be logged in the logged data 22 of the robot 16, as "localization data" and reported for the central appliance 10 to use is its map-updating operations.

Particle Evolution and Management for Map Update

As mentioned earlier, evolution of particles following the independent model use an odometry-based coupled motion model. Additionally, this motion model is modulated by a null model for specific use cases. During sections of the robot trajectory along featureless corridors (environment unbounded in the direction of travel), particle posterior (after observation, i.e., scan matched) can diverge significantly along the direction of motion and in heading angle about this direction. In case of sections lacking structures on one side of the robot, again the particles can diverge away from the side containing observable structures. In order to limit such an evolution, a null motion model is used, which applies the odometry directly to the particles with their covariance states frozen to that just prior to encountering such environment structures. In general, the particle evolution and management (resampling/killing/resetting) behaviors for the particles following the independent evolution model are similar to that for a typical particle filter SLAM pipeline. For the case of the parallel evolution model, particles clone the evolution and management behaviors as that of the MCL particles, hence also cloning its resampling behaviors. The net effect is that we end up with a healthy pool of particles that are both diverse (to accommodate for sensor and actuation limitations) and precise (and retain true world coordinate referencing) through each generation or iteration step. While new localization estimates for the independently evolved particles are computed by the coupled process (independent evolution model), localization of the MCL particles is copied over by the decoupled process for the cloned particles. Each particle in the pool of both coupled and decoupled particles then updates its map. The map update behavior prioritizes recency behaviors (via a weight parameter) and clearing of occupied cells to accommodate for task phase incremental and wholly dynamic changes, unlike the map update process in typical SLAM pipelines which retain as much cell occupancy observation as possible, while clearing unoccupied cells with a lower likelihood. This aggressive update of map cells ensures that the updated map closely resembles the current state of the environment. The final map for deployment is chosen from among the maps updated and saved by each of the particles, based on the determination of the best particle, similar to traditional online SLAM. Additionally, only stable and persistent features are added to the updated map. These are features observed over several frames/beams, are statistically significant, and survive the recency-based extinction of change points.

Trajectory Close-Out

As introduced earlier, the Trajectory Close-out module maintains trajectory consistency of observations by closing out trajectories from multiple robots based on specific constraints while ensuring causality and recency of map update behavior. These two factors—trajectory consistency, and causality/recency are contrasting goals. The trajectory close-out module is responsible for the management of sensor observations for updates (from multiple robots) that might potentially be in conflict, primarily temporally. It manages these conflicts by segmenting the particle evolution process into discrete chunks. In other words, a trajectory, as defined by a sequence of SLAM particle evolution steps and corresponding localization and map update steps, are finalized and closed out (thus preserving trajectory consistency), before a potentially overlapping trajectory (in space and time) from another robot and its corresponding observations are processed by the particle filter for a map update. Once a close-out of the second robot's trajectory is completed, the processing can then return to rest of the first robot's trajectory for update or a third robot based on which robot's unprocessed readings are earlier (thus preserving causality). By 'causality', we mean that sensor observations that are earlier in time are applied to the map update process, before applying sensor observations that are later in time, thus ensuring that the map update process results in a map that closely resembles the state of the environment from the current time instead of some time in the past. It is necessary to perform close-outs to ensure that temporal changes in the map are applied to the map update process in a 'causal' manner and any desired 'recency' behavior in map updating is preserved. Hence violations of 'causality' and 'recency' are minimized.

Maintaining 'recency' preferences are essential to handling incremental and wholly dynamic changes to the environment. Periodic changes (as characterized by 'frequency' behaviors are handled by the HMM transition probabilities. The trajectory close-out process is a significant change from a conventional continuous/online SLAM that processes all trajectories sequentially. Hence, in conventional online SLAM, sensor observations from a first robot (ordered by 'causality') are applied to update the map along the robot's trajectory. This is followed by sequential updates using trajectory data from a second robot and then from a third robot and so on. Hence, in such a conventional SLAM approach earlier readings from a second robot are applied to the map update process after later readings from the first robot, resulting in a violation of 'causality' and 'recency' criteria. 'Trajectory consistency' is preserved, however.

Besides temporal discrepancies, contradictions in environment occupancy observations could arise from error/noise in the localization, which varies as a function of sensor noise model differences, and also from sub-optimal scan matching (which is formulated as an optimization problem with no closed form solution), resulting in blurred and less confident map updates. Frequent trajectory close-outs and sensor stream switching is critical to mitigating artefacts from both error sources.

Now, the question of how trajectory close-out instances are determined remains. The trajectory close-out module identifies close-out instances by computing bounds on the particle evolution process. Trajectories cannot be closed when particles are multi-modal, indicating the possibility of a potential loop-closure within the span of trajectory further along in time as successive readings in the trajectory are processed. Trajectories cannot also be closed if the particle evolution diverges (spread in the distribution of particles), indicating a potential for re-sampling or switch of the best particle index further along in time. Hence, this module keeps track of the deviation between the coupled state and decoupled state, along with the localization score (poor localization score caused by larger mismatch between the observed environment and the map—hence less ideal for close-out) and modality count of peaks (more modes indicate more deviation in possible true hypotheses, again less ideal for close-out), as reported by the decoupled state, overall diversity of all particles (larger diversity indicates less ideal conditions for close-out), larger entropy changes between iterations (i.e., larger changes to the map for each map update step) and length of time elapsed since re-sampling (the longer elapsed time, the more stable the trajectory and the more ideal for close-out), to determine stable points of convergence of the two set of states, as well as overall particle concurrence. If sufficient time has elapsed and these required conditions are satisfied, a trajectory close-out is initiated.

It should be noted that these conditions ensure that 'trajectory consistency and integrity' are preserved (longer the trajectory, higher the consistency). As mentioned earlier, this contrasts with 'causality and recency' which are preserved if trajectories are shorter. Hence, there is a trade-off between the two and ensuring that trajectory close-out and switches happen only when the aforementioned conditions are satisfied ensures the right balance of the two factors is met. The trajectory close-out module is also responsible for finalizing trajectories when robots leave a sector tagged as a 'Map Update Region' (these are regions that the user can specify to limit the areas of the map that are expected to have changes and need to be updated).

Multi-Robot State Fusion, Trajectory Reordering and Global Optimization

While the trajectory close-out can be quite successful in mitigating artefacts, primarily those stemming from discrepancies in 'causal' observations between robots, inaccurate MCL localization, systematic errors between robot sensors and temporal synchronization errors can create blurring artefacts in the generated map. While the probabilistic nature of the map representation, along with probabilistic map cleaning and map refinement stages can reduce some of these errors, there is still potential for large errors, especially during high-speed operation of robots. To this extent, a global optimization process, based on factor graph optimization is used to handle inconsistent observations.

Global pose graph optimization that employs factor graphs and works on data from a single-robot are popular (for e.g., GT-SAM). This helps to arbitrate and resolve differing estimates of pose as measured by wheel encoders, IMU, and laser observations. The factor graph is a representation of a Bayesian network or Hidden Markov Model (HMM) over a number of robot pose steps along its trajectory. We extend the architecture of such factor graphs to resolve inconsistencies between multiple robots and thereby proposing a novel approach and application of such factor graphs.

Similar to a traditional factor graph, each node is associated with a conditional density: the Markov chain encodes the robot state priors $p(x_1)$ and transition probabilities $p(x_2|x_1)$, $p(x_3|x_2)$ and $p(x_4|x_3)$, that are defined by odometry, whereas measurements $z_t$ (such as from laser scanners) depend only on the state $x_t$ modeled by conditional densities $p(z_t|x_t)$. Given known measurement values $z'_1$, $z'_2$, $z'_3$ and $z'_4$ the true pose of the robot—hidden state sequence ($x_1$, $x_2$, $x_3$, $x_4$) are estimated such that it maximizes the posterior probability $p(x_1, x_2, x_3, x_4|z_1=z'_1, z_2=z'_2, z_3=z'_3, z_4=z'_4)$. Given the measurement variables $z_1$, $z_2$, $z_3$, $z_4$ ($z_1$ is computed as the average of feature measurements, $z_{11}$ and $z_{12}$) the posterior is proportional to the product of six factors, three of which derive from the Markov chain, and three likelihood factors defined as $L(x_t; z') \propto p(z_t=z'|x_t)$:

$$p(x_1,x_2,x_3,x_4|z_1,z_2,z_3,z_4)$$

$$\propto (x_1) \cdot p(x_2|x_1) \cdot p(x_3|x_2) \cdot p(x_4|x_3) \cdot L(x_1;z_1) \cdot L(x_2;z) \cdot L(x_3;z) \cdot L(x_4;z\ Z)$$

Now, in our extended architecture, we have additional observations from a second robot (or more robots), represented in terms of their pose hidden state variables ($y_1$, $y_2$, $y_3$, $y_4$). Incongruent occupancy pixel group clusters from multiple robot observations are added as factors in the factor graph formulation in the form of a relative pose factor (shown in gray) of the second robot and closest trajectory pose variables of the first robot's trajectory. Hence, the state variable $y_1$ is connected to variables $x_1$, $x_2$ through relative pose factors based on triangulated difference in measurements of $z_1$, $z_2$ for the two robots. The updated posterior now becomes $$p(x_1,x_2,x_3,x_4,y_1,y_2,y_3,y_4|z_1,z_2,z_3) \propto p(x_1) \cdot p(x_2|x_1) \cdot p(x_3|x_2) \cdot p(x_4|x_3).$$

$$p(y_1|x_1,x_2) \cdot p(y_2|y_1,x_2,x_3) \cdot p(y_3|y_2,x_3,x_4) \cdot p(y_4|y_3,x_4,x_2) \cdot L(x_1;z'_1) \cdot L(x_2;z'_2) \cdot L(x_3;z'_3) \cdot L(x_4;z'_4)$$

A maximum a-posteriori (MAP) inference or estimator estimates the pose parameter for which the posterior probability holds the highest density. Assuming independence between factors, this is equivalent to maximizing the product $$f(x_1,x_2,x_3,x_4,y_1,y_2,y_3,y_4) = \Pi f_i(\tilde{x}, \tilde{y})$$

i.e., the value of the factor graph. The edges of the factor graph encodes, for each factor $f_i$, which subset of variables $x_i$, $y_i$ it depends on.

This factor graph representation is solved as a pose optimization problem, wherein we only optimize/smooth over robot poses, with the final map estimated from smoothed trajectories. The optimization over the pose graph requires two components—firstly, the ability to estimate Jacobians/partial derivatives over the factors (implemented with linearized factors) and SE(2) pose groups and secondly, a non-linear optimization process to maximize the posterior densities (implemented with Levenberg-Marquardt algorithm). The resulting process reduces the incongruence between observations and reduces blurring of structures in final map.

Multi-Modal Map Generation Using Periodicity Behaviors (Stationary Distributions and Mixing Time Estimation)

As discussed earlier, in typical industrial environments, it is expected that more than one map is required to capture the environment characteristics at different points in time. This is due to the inherently periodic nature of changes typical of industrial environments. Hence, multiple modes of map representation are essential. These map modes will emerge based on the underlying structure in the data observations. In order to capture these modalities, the contemplated map updating relies on the innovative use of a Hidden Markov Model (HMM) to represent each occupancy grid cell's temporal characteristics. Conventional HMM use in SLAM has been in online localization and mapping processes to the extent of tracking deviations from the base map. Thus, one distinction in the use of HMM described here for generating multi-modes of maps and in an offline manner for subsequent use by robots 16 in performing self-localization. During, the contemplated map update process within the SLAM pipeline implemented at the computer appliance 10, the HMM keeps track of map occupancy distributions. When the distributions converge periodically (as a robot re-observes a mode in the multi-modal change to the environment), a 'stationary distribution' is generated, i.e., the distribution for each cell of the map converges to specific probabilities with insignificant change to the probabilities with additional observations in a time window. Note that in this scenario observations are windowed (or truncated) while computing the distributions.

Thus, the stationary distributions represent the case where the environment appears similar to what has been observed before. There are likely to be multiple observations of an arbitrary stationary distribution. There are also likely to be multiple stationary distributions observed. The number of stationary distributions defines the modality of the map representation. In order to simplify the implementation, a binary HMM is used, in which case, the stationary distributions are computed from transition probabilities (derived from the occupied and free space probability transitions). While memory usage during the construction of an updated map can be high due to the storage requirements for HMM cell distributions, this can be lowered in practice by culling past distributions that fit the current model of stationary distributions, as well as non-stationary distributions composed of all other observations that do not represent significant changes to the environment.

In addition to identifying stationary distributions, we also identify 'mixing times' of the HMM. Mixing time (in our context), is defined to be the time required to converge from one stationary distribution to another. This is represented in the HMM as the number of steps required for each occupancy cell to transition from the first stationary distribution to the next one. These steps include cases where a cell is being observed (depending on the position of the robot in the environment), and also when it is unobserved. In order to compare two cell distributions to determine if they are similar enough to be classified as stationary distributions (observed periodically) and to estimate the completion of transition from the first stationary distribution to the next, we use the Total Variation Distance. The mixing time is the minimum time that minimizes the distance between two stationary distributions. The mixing time is also used to cull past history of cell distributions in order to minimize memory usage. Additionally, the time between observations of the same stationary distribution is tracked.

From these stationary distributions of the map cell occupancies and their corresponding mixing times, the modes of the map representation are generated and timing prior for deployment of the modes determined. Note that the timing prior (based on mixing time) is a suggested timing in order for the localizer (during task phase localization with a given multi-modal map) to deploy the map mode. Alternatively, it is possible for the task phase localizer to localize the robot based on all available modes, to determine the best mode to use at any point of time. Such an implementation can be computationally expensive but is more robust to varying periodicity of changes to the mapped environment. The total number of map modes can also be restricted to improve computational efficiency.

Figure 13:
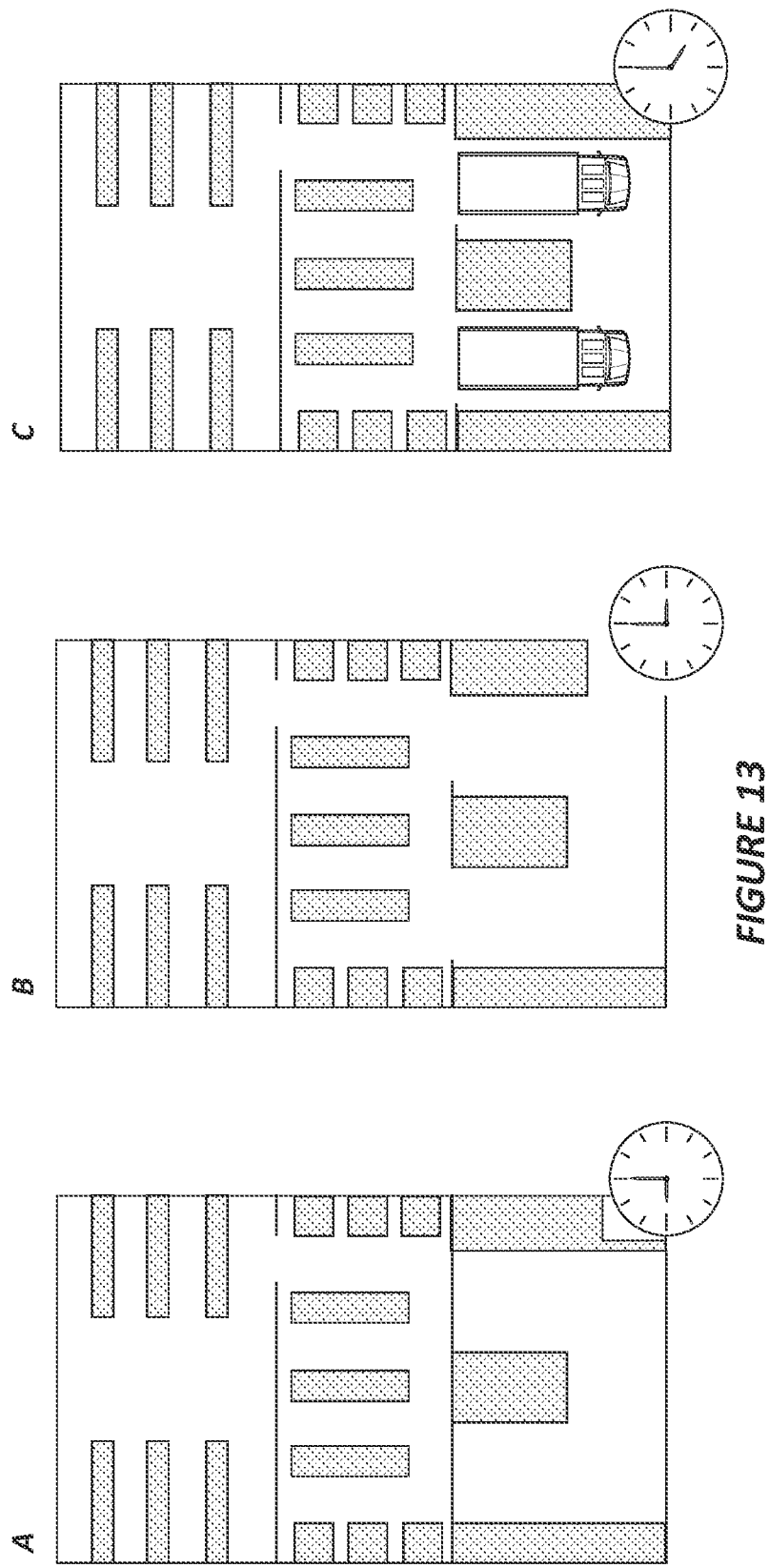
FIG. 13 is a block diagram of one example of a multimodal environment.

An example of a case where timing prior based multi-modal map representation is useful is shown in FIG. 13. This example demonstrates the case of a loading dock in a warehouse. From an analysis of scanner observations of the environment 14, it is seen that there are three map modes—corresponding to views containing closed loading dock roll-up doors (Mode A in FIG. 13), open doors (Mode B in FIG. 13), with a possible additional mode wherein an open loading dock roll-up door leads to a view of a parked shipping truck (Mode C in FIG. 13). This (third) mode is typically observed by one or more robots 16 for a sufficient length of time and with good periodicity in a typical warehouse with large daily shipments both going in and coming out, but is less deterministic than the other two, due to the fact that this mode is likely to be observed with shipments incrementally occluding the field of view of the model during the loading/unloading processes. Once these modes are computed, these can be preserved between runs of SLAM pipeline for further map enhancements. The multi-modal HMM modeling implemented by the computer appliance 10 for the BOMU enables detection of these modes.

System State Freeze

A system state free module is responsible for finalizing the SLAM map update process and logging/serializing the state of update process, in terms of particle probabilistic occupancy grid data and trajectory data. However, given the hybrid particle evolution model, a full state of all particles is not necessary for re-initializing the SLAM map update process. Preserving the probabilistic occupancy grid and HMM states is necessary for ensuring continuity between map update calls and to correctly model 'recency' effects.

Trajectory data is helpful in case the task phase robot operation involves movement through large featureless open areas (especially if driven manually or using a line/path following system), in the context of executing loop closure behaviors on a re-initialization of the map update process. Trajectory data is useful for any additional global optimization runs and also for manual landmark insertion/editing (such as for goals) in a post-processing step after a map update.

Map Landmark and Meta-Data Translation

The map landmark and meta-data translation module is responsible for preserving and translating landmarks and other interest points that are present in the original version of the map 12 and used in task phase operation in the new updated map. Since the world coordinate system of the current version of the map 12 and the updated version of the map 12 (after running a map update) are preserved (after transformation to the SLAM occupancy grid coordinate system) for most use cases, the translation is straightforward. However, goals and other traversable landmarks that are located in occupancy grid cells that are now deemed to be occupied are removed from the final updated version of the map 12. This removal ensures that once an updated map 12 is deployed to the robots 16, there are no unreachable goals and potential for any collisions. Furthermore, in exceptional cases, if sections in the occupancy grid cells are deformed (elongated), as a result of computation of better estimates for metric world map positions as part of the map update process, landmarks affected are updated suitably (by computing a projective trajectory transformation).

Figure 14:
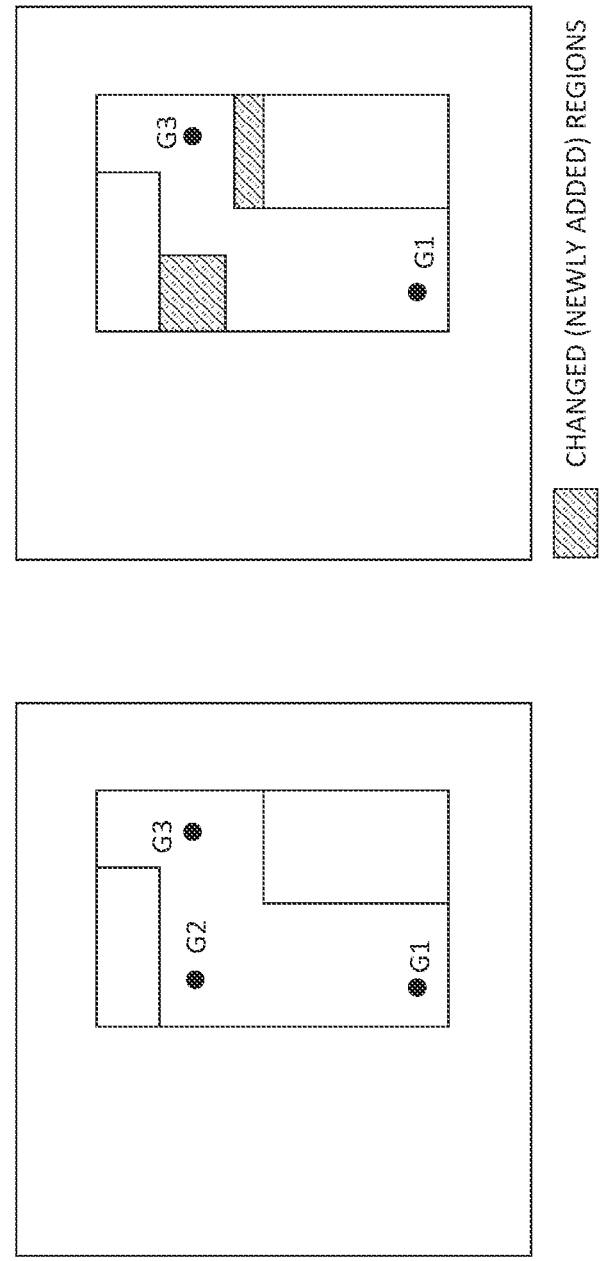
FIG. 14 a block diagram of an example updated environment map.

Similarly, in addition to goals, other landmarks, such as those for docks, sectors and zones are also translated into the final map (as shown in FIG. 14). It should be noted that map regions around docks, goals, or other areas where robots and other mobile units (such as palletizers, pallet jacks and forklifts) might be parked for extended periods of time might get added to the map. At this point, the user is expected to clean the map 12 of such structures prior to deployment of the map 12 to the robots 16.

In more detail, FIG. 14 depicts an example result of the BOMU with landmark translation. The initial or current version of the map 12 appears on the left, with goals and docks set up for task phase operation of robots. On the right, the updated version of the map 12 appears, with the updates determined using (historic) logged data 22 collected from the robots 16 during normal, live operation of the robots 16 in the environment 14 using a prior version of the map 12. During such task-phase operations (in this specific example), the robots 16 are patrolled between the three goals while observing additional structures enclosing the space of operation of the robots and positioned at various orientations. These were incrementally changed during the task phase operation. The updated map on the right shows these structures inserted in the map space (hatched). Sections of the map unobserved by the robots during task phases operation retain their original map occupancy information. Also note that goal and dock positions have been translated into the updated map, with goals that are not traversable (G2) removed from the updated map, while goals G1 and G3 remain.

With the above examples in mind, this document broadly discloses a method and apparatus to update maps during task phase of deployment of mobile robots, in an autonomous and centralized manner. The method in one or more embodiments includes any one or more of: a procedure to incorporate dynamic changes to fixed maps—incremental, periodic, as well as wholly dynamic; a procedure to automatically extract modality (count) of dynamic change distributions from sensor logs and map transition behaviors, as implemented using an innovative HMM-based stationarity estimation process; a procedure to fuse states from task phase operation and offline computation for hybrid state estimation resulting in updated maps. This is designed as a novel hybrid of a 'Decoupled Map Update Process' and a 'Coupled Simultaneous Localization and Map Update Process' (while the 'coupled process' estimates the localization and the map update steps iteratively and simultaneously in an offline manner, the decoupled process separates the localization and map update steps, with the localization happening in the online phase as part of task phase operation of the robot—implemented as an MCL particle filter and the map update happening in an offline phase); a procedure to fuse sensor streams from multiple robots that overlap in terms of observations (specifically, time of observation) and may or may not contradict, with such operations relying on an innovative Trajectory close-out module; and a procedure to resolve incompatibilities between sensor observations from multiple robots through the estimation of grid cell landmarks and global optimization.

According to the several embodiments herein, a map updating process involves a system 8 that includes a computer appliance 10, such as a computer server, and one or more robots 16. The robots 16 contribute to the contemplated map updating processing by carrying out self-localization within an environment 14 using a local static copy of a map 12 of the environment 14. Logged data 22 generated by the respective robots 16 as they operate within the environment 14 is provided to the computer appliance 10, with such data comprising, for example, the particles generated by the respective robots using a particle-filter based Monte Carlo Localizer (MCL) function, along with the sensor data used to generate those particles. Advantageously, the computer appliance 10 uses this historic logged data 22 to run a SLAM algorithm that is optimized for batch processing of the collected data (and accounting for sensing/localization errors between robots 16), changing modes of the environment 14, and the different trajectories of multiple robots 16 traversing the same map areas.

Because the computational and memory burdens for map updating rest with the computer appliance 10, and because the map updating computations are carried out by the computer appliance 10 while the robots 16 may continue their normal task operations within the environment 14, the contemplated approach does not suffer from the constraints on complexity and time that apply to the conventional case where individual robots must perform simultaneous localization and mapping in real time or near real time, as they operate within the environment 14. Consequently, the quality of map updating may be substantially improved by using logged data 22 spanning longer time periods or relating to different modes of the environment 14 and using/reconciling logged data 22 from multiple robots 16, which allows for mitigating robot-specific errors in sensing and odometry.

Notably, modifications and other embodiments of the disclosed invention(s) will come to mind to one skilled in the art having the benefit of the teachings presented in the foregoing descriptions and the associated drawings.

Among notable items disclosed herein are the following items:

1. A method and apparatus to update maps during task phase of deployment of mobile robots, in an autonomous and centralized manner.

2. A method and procedure to incorporate dynamic changes to fixed maps—incremental, periodic, as well as, wholly dynamic.
3. A method and procedure to automatically extract modality (count) of dynamic change distributions from sensor logs and map transition behaviors. This is implemented as a novel HMM based stationarity estimation process.
4. A method and procedure to fuse states from task phase operation and offline computation for hybrid state estimation resulting in updated maps. This is designed as a novel hybrid of a 'Decoupled Map Update Process' and a 'Coupled Simultaneous Localization and Map Update Process'. While the 'coupled process' estimates the localization and the map update steps iteratively and simultaneously in an offline manner, the decoupled process separates the localization and map update steps, with the localization happening in the online phase as part of task phase operation of the robot—implemented as an MCL particle filter and the map update happening in an offline phase.
5. A method and procedure to fuse sensor streams from multiple robots that overlap in terms of observations (specifically, time of observation) and may or may not contradict. This is designed as a novel Trajectory close-out module.
6. A method and procedure to resolve incompatibilities between sensor observations from multiple robots through the estimation of grid cell landmarks and global optimization.

EXAMPLE EMBODIMENTS

1. A computer appliance 10 comprising (a) a communication interface 30, and (b) processing circuitry 32 that is configured to (i) receive, via the communication interface 30, logged data 22 generated by individual robots 16 performing self-localization within the environment 14 using a static copy of the map 12, and (ii) perform an update of the map 12 by running a simultaneous localization and mapping (SLAM) algorithm that uses the received logged data 22.

2. The computer appliance 10 of embodiment 1, wherein the processing circuitry (32) is configured to perform the update on a triggered basis.

3. The computer appliance 10 of embodiment 2, wherein the triggered basis is a periodic basis, and wherein the processing circuitry 32 is configured to perform the update repeatedly according to a defined interval.

4. The computer appliance 10 of embodiment 3, wherein the processing circuitry 32 is configured to adjust the defined interval in dependence on an extent or a nature of map changes determined by the computer appliance 10 at one or more of the repeated updates.

5. The computer appliance 10 of embodiment 2, wherein the triggered basis is a map-quality basis, and wherein the processing circuitry 32 is configured to perform the update responsive to determining that a quality of the map 12 has deteriorated by more than a threshold amount.

6. The computer appliance 10 of any of embodiments 1-5, wherein the processing circuitry 32 is configured to generate an alert, indicating performance of the update, or otherwise indicating availability of an updated version of the map 12 resulting from the update.

7. The computer appliance 10 of any of embodiments 1-6, wherein the processing circuitry 32 is configured to initiate transmission of map update information to the individual robots 16, for use by each robot 16 in updating the local static copy of the map 12, the map update information comprising an updated version of the map 12 or change data indicating updates to the map 12.

8. The computer appliance 10 of embodiment 7, wherein the processing circuitry 32 is configured to initiate the transmission of the map update information in response to the computer appliance 10 receiving an input signal indicating permission to initiate the transmission.

9. The computer appliance 10 of any of embodiments 1-8, wherein the communication interface 30 is a wireless communication interface configured to receive the logged data 22 wirelessly.

10. The computer appliance 10 of any of embodiments 1-9, wherein the logged data 22 from each robot 16 comprises sensor data from one or more types of sensors used by the robot 16.

11. The computer appliance of embodiment 10, wherein the sensor data includes odometry data.

12. The computer appliance of embodiment 10 or 11, wherein the logged data 22 from each robot 16 includes particle-filter data generated by each robot 16 using a Monte Carlo Localizer (MCL) function.

13. The computer appliance 10 of embodiment 12, wherein the SLAM algorithm run by the computer appliance 10 is a particle-filter based SLAM algorithm that uses particles comprised in the particle-filter data from the individual robots 16 to determine map update information (MUI) 24 for the map 12.

14. The computer appliance 10 of embodiment 13, wherein the particle-filter data from each robot 16 comprises particles, each particle representing a possible pose of the robot 16 within the environment 14.

15. The computer appliance 10 of any of embodiments 10-14, wherein the processing circuitry 32 is configured to accumulate the received logged data according to a defined accumulation interval or volume threshold, to form a data batch, and wherein the processing circuitry is further configured to perform the update of the map 12 by running the SLAM algorithm on the data batch.

16. A method 300 of operation by a computer appliance 10, the method 300 comprising (a) receiving (Block 302) logged data 22 generated by individual robots 16 operating within the environment 14, and (b) performing (Block 304) an update of the map 12 by running a simultaneous localization and mapping (SLAM) algorithm that uses the received sensor and logged data 22.

17. The method 300 of embodiment 16, further comprising performing the update on a triggered basis.

18. The method 300 of embodiment 17, wherein the triggered basis is a periodic basis, and wherein the method 300 includes performing the update repeatedly according to a defined interval.

19. The method 300 of embodiment 18, wherein the method 300 further comprises adjusting the defined interval in dependence on an extent or a nature of map changes determined by the computer appliance 10 at one or more of the repeated updates.

20. The method 300 of embodiment 17, wherein the triggered basis is a map-quality basis, and wherein the method 300 comprises performing the update responsive to determining that a quality of the map 12 has deteriorated by more than a threshold amount.

21. The method 300 of any of embodiments 16-20, further comprising generating an alert, indicating performance of the update, or otherwise indicating availability of an updated version of the map 12 resulting from the update.

22. The method 300 of any of embodiments 16-21, further comprising initiating transmission of map update information 24 to the individual robots 16, for use by each robot 16 in updating the local static copy of the map 12, the map update information (MUI) 24 comprising an updated version of the map 12 or change data indicating updates to the map 12.

23. The method 300 of embodiment 22, the transmission of the map update information is initiated response to the computer appliance 10 receiving an input signal indicating permission to initiate the transmission.

24. The method 300 of any of embodiments 16-23, wherein the method 300 includes receiving the logged data 22 wirelessly.

25. The method 300 of any of embodiments 16-24, wherein the logged data 22 from each robot 16 comprises sensor data obtained via one or more types of sensors of the robot (16), wherein the sensor data may include environmental sensing data used by the robot 16 for self-localization in the environment 14, and wherein the logged data 22 may further comprise at localization processing results, such as particles from a particle-filter based localization algorithm used by the robot 16 for self-localization in the environment 14.

26. The method 300 of embodiment 25, wherein the SLAM algorithm run by the computer appliance 10 is a particle-filter based SLAM algorithm that uses particles comprised in particle-filter data included in the logged data 22 from the individual robots 16, to determine an updated version of the map 12.

27. The method 300 of any of embodiments 25-27, wherein the method 300 includes accumulating the received logged data 22 according to a defined accumulation interval or volume threshold, to form a data batch, and wherein the processing circuitry 32 is further configured to perform the update of the map 12 by running the SLAM algorithm on the data batch.

28. A robot 16 comprising (a) a drive system 40 configured to move the robot 16 within an environment 14, (b) an odometry system 42 configured to track movement of the robot 16 within the environment 14 on a dead-reckoning basis, (c) an environmental-sensing system 44 configured to sense characteristics of the environment 14, and (d) a robot-control system 46. The robot control system 46 is configured to (i) perform self-localization of the robot 16 while the robot 16 operates in the environment 14, the self-localization performed using a static copy of a map 12 of the environment 14 held in a memory 48 of the robot 16, (ii) log data as logged data 22, the logged data 22 generated by one or more types of sensors of the robot 16, during operation of the robot 16 in the environment 14, and (iii) transmit the logged data 22 via a communication link 18 to a remote computer appliance 10 or a proxy 20 thereof, for use by the computer appliance 10 in updating the map 12.

29. The robot 16 of embodiment 28, wherein the robot-control system 46 is further configured to (a) receive map update information (MUI) 24 comprising an updated version of the map 12, or change data indicating updates to the map 12, the map update information generated by the remote computer appliance using the logged data 22 transmitted by the robot 16 or like logged data transmitted by one or more other robots 16 operating in the environment 14, (b) determine an updated local static copy of the map 12, from the map update information, and (c) perform further self-localization while operating in the environment 14, the further self-localization performed by the robot 16 using the updated local static copy of the map 12.

30. The robot (16) of embodiment 28 or 29, wherein the robot-control system (46) is configured to perform the self-localization and furthermore, self-localization using a Monte Carlo Localizer (MCL) function that is based on particle filtering.

31. The robot of any of embodiments 28-30, wherein the self-localization is based on the robot-control system 46 running a particle-filter based algorithm, and wherein the logged data 22 logged by the robot-control system 46 at least comprises environmental sensing data obtained by the environmental sensing system 44 of the robot 16 for performing self-localization of the robot 16 in the environment 14, wherein the logged data 22 may further comprise at least one of particle-filter data produced by the particle-filter algorithm and odometry data obtained from the odometry system 42 and used by the robot-control system 46 for performing self-localization of the robot 16 in the environment 14, and wherein the environmental sensing data comprises sensor data from one or more types of sensors included in the environmental sensing system 44.

32. The robot 16 of embodiment 31, wherein the particle-filter data comprises particles.

33. A method 400 performed by a robot 16, the method 400 comprising (a) performing (Block 402) self-localization of the robot 16 while the robot 16 operates in the environment 14, the self-localization performed using a static copy of a map 12 of the environment 14 held in a memory 48 of the robot 16, (b) logging (Block 404) data as logged data 22, the data generated from one or more types of sensors of the robot 16 while the robot 16 operates in the environment 14, and (c) transmitting (Block 406) the logged data 22 via a communication link 18 to a remote computer appliance 10 or a proxy 20 thereof, for use by the computer appliance 10 in updating the map 12.

FIG. 15 illustrates a method 1500 of operation of a computer appliance 10 according to one embodiment, wherein the method 1500 can be understood as a combination of the operations depicted in FIGS. 3, 5, and 6, or a variation or extension of such operations.

The method 1500 comprises the computer appliance 10 monitoring (Block 1502) localization quality for one or more robots 16 performing autonomous navigation in an environment 14 according to a static map 12 of the environment 14. The localization quality experienced by any particular robot 16 at any particular time depends upon the degree to which a relevant portion of the static map 12 agrees with local environmental features sensed by the robot 16. For example, laser scan data or point cloud data obtained by the robot 16 during a given scan cycle indicates certain features in the environment 14, such as a corner, a doorway, etc., and the localization quality depends upon the extent to which the static map 12 includes the same or similar features in relation to the location and orientation of the robot 16 associated with the scan data. Broadly, each robot 16 includes one or more types of sensors used to sense its local surroundings within the larger environment 14, and such data may be referred to as environmental sensing data.

The method 1500 further comprises the computer appliance 10 triggering an update procedure responsive to the monitored localization quality for one or more of the one or more robots falling below a defined threshold ("YES" from Block 1504). If the monitored localization quality is above the defined threshold ("NO" from Block 1504), processing returns to Block 1502 for continued monitoring. Performing the update procedure comprises the computer appliance 10 outputting (Block 1506) map update information for the static map 12, for transmission to the one or more robots 16.

The map update information is computed from historic logged data 23 collected based on one or more of the one or more robots 16 reporting logged data 22 during operation in the environment 14, the logged data 22 from any particular robot 16 comprising sensor data used by the particular robot 16 for performing localization for autonomous navigation within the environment 14, along with one or both of corresponding odometry data and corresponding localization data generated by localization processing performed by the particular robot 16.

The update procedure further comprises, for example, the computer appliance 10 computing the map update information 24 as part of the update procedure, according to the historic logged data 23 then available to the computer appliance 10.

In at least one embodiment, the computer appliance 10 computes the map update information 24 further based on historic update information determined by the computer appliance 10 from one or more prior executions of the update procedure by the computer appliance 10.

The computer appliance 10 is configured to compute the map update information 24 on a recurring basis, in one or more embodiments, with each such computation using the historic logged data 23 then available to the computer appliance 10. The update procedure in such embodiments outputs the most-recently computed map update information.

Outputting the map update information 24 in at least one embodiment comprises conditionally transmitting the map update information 24 to the one or more robots 16, responsive to receiving a user input indicating an acceptable map quality for the map update information 24. Outputting the map update information 24 conditionally comprises, for example, outputting graphical information for display to a user of the computer appliance 10. The graphical information is a graphical depiction of the static map 12 updated according to the map update information 24, for determination by the user of whether the quality of the map update information 24 is acceptable. Such operations appear in FIG. 16, illustrated as operations 1506A, 1506B, 1506C, and 1506D. Operations of Block 1506A comprise outputting graphical information for display to a user of the computer appliance, where the graphical information is a graphical depiction of the static map updated according to the map update information; at Block 1506B, it is determined whether the map quality is acceptable; if the map quality is acceptable ("YES" from Block 1506B), processing continues from Block 1506B with outputting map update information (Block 1506C), but, if the map quality is not acceptable ("NO" from Block 1506B), processing continues from Block 1506B with outputting an alert (Block 1506D).

Outputting the map update information 24 comprises transmitting the map update information 24 to one or more of the one or more robots 16 or transmitting the map update information 24 to a proxy device 20 that forwards the map update information 24 to the one or more robots 16.

In at least one embodiment, outputting the map update information 24 comprises outputting a prompt indicating that the map update information 24 is available for transmission to the one or more robots 16 and responsive to supervisory input from a local or remote user of the computer appliance 10, transmitting the map update information 24 to the one or more robots 16 or to a proxy device 20 that forwards the map update information 24 to the one or more robots 16.

One or more embodiments of the method 1500 include limiting data logging by the one or more robots 16 to specified areas within the environment. For example, the computer appliance 10 outputs map information that identifies the specified areas, for transmission to the one or more robots 16. The specified areas may be user configured, such as where the computer appliance receives user input defining the specified area(s).

The method 1500 in one or more embodiments includes recognizing periodical changes in map states during computation of the map update information, where such periodical changes are referred to as map modalities. The respective map modalities are associated with corresponding time intervals, e.g., times of the day. In at least one such embodiment, the map update information 24 comprises two or more modal maps reflecting different map modalities, for use by the one or more robots 16 during the corresponding time intervals associated with the map modalities. Thus, in one or more embodiments, robots updating their respective copies of the static map 12 according to the map update information 24 will have modality-specific mapping for deployment at the corresponding times.

The method 1500 may further comprise the computer appliance 10 computing the map update information 24 either as part of the triggered update procedure or on a recurring basis so that the map update information 24 is available for use in the triggered update procedure. Any particular instance of the computation of the map update information 24 by the computer appliance 10 relies on the historic logged data 23 then available to the computer appliance 10.

In at least one embodiment where the historic logged data 23 spans one or more intervals of operational time within the environment 14 for one or more of the one or more robots 16, the method 1500 further comprises the computer appliance 10 identifying discrepancies in localization determinations or feature observations made by respective robots 16 with respect to a same region within the environment 14 and resolving the discrepancies during computation of the map update information 24. Resolving the discrepancies during the computation of the map update information comprises, for example, resolving discrepancies between first data from a first one of the one or more robots 16 and related second data from a second one of the one or more robots 16, wherein the resolution is using the most recent data, as between the first data and the second data.

In one or more embodiments, each of the one or more robots 16 performs autonomous navigation in the environment 14 according to the static map 12, using a robot-instantiated Monte Carlo Localizer (MCL) which is particle-filter based and performs localization but does not update the static map. Correspondingly, the method 1500 in at least one such embodiment comprises the computer appliance 10 computing the map update information 24 by, with respect to each robot (16) represented in the historic logged data (23), executing a coupled process in which the computer appliance 10 runs an appliance-instantiated SLAM process that is particle-filter based and performs simultaneous localization and updating of the static map 12, and executing a decoupled process that clones selected particles from respective localization cycles performed by the robot-instantiated MCL and evolves the selected particles using a motion model that is identical to the motion model used by the robot-instantiated MCL, but with an additional step of map updating for each particle. The coupled process evolves particles of the appliance-instantiated SLAM process independent of particle evolutions that occurred in the robot-instantiated MCL but based on odometry data and corresponding environmental sensing data used in the robot-instantiated MCL. Such operations are comprised in the overall BOMU process described herein, in one or more embodiments.

The method in such embodiments further includes the computer appliance 10 comparing map updates determined via the coupled process and the decoupled process, to obtain finalized map updates for outputting as the map update information 24. The finalized map updates are based on determination of the best particle in terms of localization score, from a pool of particles comprising the coupled particles of the coupled process and the decoupled particles of the decoupled process.

A computer appliance 10 according to one or more embodiments comprises a communication interface 30 and processing circuitry 32 that is operatively associated with the communication interface 30. The processing circuitry 32 is configured to carry out any one or more of the operations described above for the method 1500. For example, the processing circuitry 32 is configured to monitor localization quality for one or more robots (16) performing autonomous navigation in an environment (14) according to a static map (12) of the environment 14, the localization quality experienced by any particular robot 16 at any particular time being dependent upon the degree to which a relevant portion of the static map 12 agrees with local environmental features sensed by the robot 16. Further, the processing circuitry 32 is configured to trigger an update procedure responsive to the monitored localization quality for one or more of the one or more robots 16 falling below a defined threshold.

The update procedure comprises the processing circuitry 32 outputting map update information 24 for the static map 12, for transmission to the one or more robots 16. The map update information 24 is computed from historic logged data 23 based on one or more of the one or more robots 16 reporting logged data 22 during operation in the environment 14, and the logged data 22 from any particular robot 16 comprises sensor data used by the particular robot 16 for performing localization for autonomous navigation within the environment 14, along with one or both of corresponding odometry data and corresponding localization data used in localization processing performed by the particular robot 16.

With the above examples in mind, the disclosed invention (s) is/are not limited to the specific embodiments disclosed and that modifications and other embodiments are included within the scope of this disclosure. Although specific terms may be employed herein, they are used in a generic and descriptive sense only and not for purposes of limitation.

What is claimed is:

1. A method performed by a computer appliance, the method comprising:
monitoring localization quality for one or more robots performing autonomous navigation in an environment according to a static map of the environment, the localization quality experienced by any particular robot at any particular time dependent upon the degree to which a relevant portion of the static map agrees with local environmental features sensed by the robot; and
triggering an update procedure responsive to the monitored localization quality for one or more of the one or more robots falling below a defined threshold, the update procedure comprising outputting map update information for the static map, for transmission to the one or more robots, the map update information computed from historic logged data based on one or more of the one or more robots reporting logged data during operation in the environment, the logged data from any particular robot comprising sensor data used by the particular robot for performing localization for autonomous navigation within the environment, along with one or both of corresponding odometry data and corresponding localization data used in localization processing performed by the particular robot; and
wherein each of the one or more robots performs autonomous navigation in the environment according to the static map, using a robot-instantiated Monte Carlo Localizer (MCL) which is particle-filter based and performs localization but does not update the static map, and wherein the method further comprises the computer appliance computing the map update information by, with respect to each robot represented in the historic logged data:
executing a coupled process in which the computer appliance runs an appliance-instantiated Simultaneous Localization and Mapping (SLAM) process that is particle-filter based and performs simultaneous localization and updating of the static map, the coupled process evolving particles of the appliance-instantiated SLAM process independent of particle evolutions that occurred in the robot-instantiated MCL, but based on odometry data and corresponding environmental sensing data used in the robot-instantiated MCL;
executing a decoupled process that clones selected particles from respective localization cycles performed by the robot-instantiated MCL and evolves the selected particles using a motion model that is identical to the motion model used by the robot-instantiated MCL, but with an additional step of map updating for each particle; and
comparing map updates determined via the coupled process and the decoupled process, to obtain finalized map updates for outputting as the map update information through determination of the best particle in terms of localization score, from a pool of particles comprising coupled particles of the coupled process and decoupled particles of the decoupled process.

2. The method of claim 1, wherein the update procedure further comprises the computer appliance computing the map update information as part of the update procedure, according to the historic logged data then available to the computer appliance.

3. The method of claim 2, wherein the computer appliance computes the map update information further based on historic map update information from one or more prior executions of the update procedure by the computer appliance.

4. The method of claim 1, wherein the computer appliance is configured to compute the map update information on a recurring basis, with each such computation using the historic logged data then available to the computer appliance, and wherein the update procedure outputs the most-recently computed map update information.

5. The method of claim 1, wherein outputting the map update information comprises outputting the map update information for transmission to the one or more robots in response to receiving a supervisory input from a user of the computer appliance.

6. The method of claim 1, wherein outputting the map update information comprises transmitting the map update information to one or more of the one or more robots or transmitting the map update information to a proxy device that forwards the map update information to the one or more robots.

7. The method of claim 1, wherein the method further comprises limiting data logging by the one or more robots to specified areas within the environment, by outputting map information that identifies the specified areas, for transmission to the one or more robots.

8. The method of claim 7, further comprising receiving user input that specifies the areas where an update of the static map is permitted.

9. The method of claim 1, wherein the method comprises computing the map update information, and wherein computing the map update information includes recognizing periodical changes in map states, which are referred to as map modalities, each map modality reflecting a recurring state of the environment and having a corresponding time interval associated with it.

10. The method of claim 9, wherein the map update information comprises two or more modal maps reflecting different map modalities, for use by the one or more robots during the corresponding time intervals associated with the map modalities.

11. The method of claim 1, wherein the historic logged data spans one or more intervals of operational time within the environment for one or more of the one or more robots, and wherein the method further comprises identifying discrepancies in localization determinations or feature observations made by respective robots with respect to a same region within the environment and resolving the discrepancies during computation of the map update information.

12. The method of claim 11, wherein resolving the discrepancies during the computation of the map update information comprises, with respect to discrepancies between first data from a first one of the one or more robots and related second data from a second one of the one or more robots, resolving the discrepancies using the most recent data, as between the first data and the related second data.

13. A computer appliance comprising:
a communication interface; and
processing circuitry operatively associated with the communication interface and configured to:
monitor localization quality for one or more robots performing autonomous navigation in an environment according to a static map of the environment, the localization quality experienced by any particular robot at any particular time dependent upon the degree to which a relevant portion of the static map agrees with local environmental features sensed by the robot; and
trigger an update procedure responsive to the monitored localization quality for one or more of the one or more robots falling below a defined threshold, the update procedure comprising outputting map update information for the static map, for transmission to the one or more robots, the map update information computed from historic logged data based on one or more of the one or more robots reporting logged data during operation in the environment, the logged data from any particular robot comprising sensor data used by the particular robot for performing localization for autonomous navigation within the environment, along with one or both of corresponding odometry data and corresponding localization data used in localization processing performed by the particular robot; and
wherein each of the one or more robots performs autonomous navigation in the environment according to the static map, using a robot-instantiated Monte Carlo Localizer (MCL) which is particle-filter based and performs localization but does not update the static map, and wherein the processing circuitry is further configured to compute the map update information by, with respect to each robot represented in the historic logged data:
executing a coupled process in which the computer appliance runs an appliance-instantiated Simultaneous Localization and Mapping (SLAM) process that is particle-filter based and performs simultaneous localization and updating of the static map, the coupled process evolving particles of the appliance-instantiated SLAM process independent of particle evolutions that occurred in the robot-instantiated MCL, but based on odometry data and corresponding environmental sensing data used in the robot-instantiated MCL;
executing a decoupled process that clones selected particles from respective localization cycles performed by the robot-instantiated MCL and evolves the selected particles using a motion model that is identical to the motion model used by the robot-instantiated MCL, but with an additional step of map updating for each particle; and
comparing map updates determined via the coupled process and the decoupled process, to obtain finalized map updates for outputting as the map update information through determination of the best particle in terms of localization score, from a pool of particles comprising coupled particles of the coupled process and decoupled particles of the decoupled process.

14. The computer appliance of claim 13, wherein the processing circuitry is further configured to compute the map update information as part of the update procedure, according to the historic logged data then available to the computer appliance.

15. The computer appliance of claim 14, wherein the processing circuitry is configured to compute the map update information further based on historic map update information and historic logged data from one or more prior executions of the update procedure by the processing circuitry.

16. The computer appliance of claim 13, wherein the processing circuitry is configured to compute the map update information on a recurring basis, with each such computation using the historic logged data then available to the computer appliance, and wherein the update procedure outputs the most-recently computed map update information.

17. The computer appliance of claim 13, wherein the processing circuitry is configured to output the map update information for transmission to the one or more robots in response to receiving a supervisory input from a user of the computer appliance.

18. The computer appliance of claim 13, wherein, via the communication interface, the processing circuitry is configured to output the map update information by transmitting to one or more of the one or more robots or transmitting the map update information to a proxy device that forwards the map update information to the one or more robots.

19. The computer appliance of claim 13, wherein the processing circuitry is configured to limit data logging by the one or more robots to specified areas within the environment, by outputting map information that identifies the specified areas, for transmission to the one or more robots.

20. The computer appliance of claim 19, wherein the processing circuitry is configured to receive user input that defines the specified areas where an update of the static map is permitted.

21. The computer appliance of claim 13, wherein the processing circuitry is configured to compute the map update information and wherein, as part of computing the map update information, the processing circuitry is configured to recognize periodical changes in map states, which are referred to as map modalities, each map modality reflecting a recurring state of the environment and having a corresponding time interval associated with it.

22. The computer appliance of claim 21, wherein the map update information comprises two or more modal maps reflecting different map modalities, for use by the one or more robots during the corresponding time intervals associated with the map modalities.

23. The computer appliance of claim 13, wherein the historic logged data spans one or more intervals of operational time within the environment for one or more of the one or more robots, and wherein the processing circuitry is configured to identify discrepancies in localization determinations or feature observations made by respective robots with respect to a same region within the environment and resolve the discrepancies during computation of the map update information.

24. The computer appliance of claim 23, wherein, to resolve the discrepancies during the computation of the map update information with respect to discrepancies between first data from a first one of the one or more robots and related second data from a second one of the one or more robots, the processing circuitry is configured to resolve the discrepancies using the most recent data, as between the first data and the related second data.

* * * * *